(12) United States Patent
Quatrano

(10) Patent No.: US 9,794,760 B2
(45) Date of Patent: Oct. 17, 2017

(54) COLLABORATIVE GROUP AND CONTENT MANAGEMENT UTILIZING USER ACTIVATED COLLABORATION THREADS

(71) Applicant: Cisco Technology, Inc., San Jose, CA (US)

(72) Inventor: Stephen Quatrano, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 13/803,079

(22) Filed: Mar. 14, 2013

(65) Prior Publication Data
US 2014/0280602 A1   Sep. 18, 2014

(51) Int. Cl.
G06F 15/16 (2006.01)
H04W 4/08 (2009.01)
H04L 29/08 (2006.01)

(52) U.S. Cl.
CPC ............... *H04W 4/08* (2013.01); *H04L 67/02* (2013.01)

(58) Field of Classification Search
USPC ........................................................ 709/205
See application file for complete search history.

(56) References Cited

U.S. PATENT DOCUMENTS

| | | | |
|---|---|---|---|
| 7,593,995 B1* | 9/2009 | He ....................... | G06Q 10/107 707/999.003 |
| 7,978,828 B1* | 7/2011 | Edamadaka .......... | H04L 12/586 379/88.13 |
| 8,095,595 B2 | 1/2012 | Bobbitt et al. | |
| 2006/0123347 A1* | 6/2006 | Hewitt ................. | G06F 9/4443 715/748 |
| 2007/0226032 A1* | 9/2007 | White et al. ....................... | 705/9 |
| 2008/0229213 A1* | 9/2008 | Hamilton ............... | G06Q 10/10 715/751 |
| 2010/0011373 A1* | 1/2010 | Youel ..................... | H04L 51/36 719/313 |

(Continued)

OTHER PUBLICATIONS

O'Neal, Anna. 'Discovering Activity Explorer in the IBM Workplace Managed Client'. IBM developerWorks Techincal Library [online]. IBM, Jul. 26, 2005 [retrieved on Jun. 7, 2016]. Retrieved from the Internet: <URL:http://www.ibm.com/developerworks/lotus/library/ae/>.*

(Continued)

*Primary Examiner* — Kevin Bates
*Assistant Examiner* — Dae Kim
(74) *Attorney, Agent, or Firm* — Edell, Shapiro & Finnan, LLC

(57) ABSTRACT

Systems and techniques facilitate capturing, via a server, a communication between a plurality of participants via computing devices of the participants and utilizing a communication tool associated with the computing devices. The server links the communication to a collaboration thread that is accessible by each participant via a computing device of each participant, where the collaboration thread includes a container object that provides access to stored content associated with each communication linked to the collaboration thread. The server further notifies each participant of the collaboration thread including an indication that the collaboration thread has been revised based upon the linking of the communication to the collaboration thread.

27 Claims, 12 Drawing Sheets

(56) References Cited

U.S. PATENT DOCUMENTS

| | | | | |
|---|---|---|---|---|
| 2011/0035687 A1* | 2/2011 | Katis | ............... | H04L 12/1827 |
| | | | | 715/758 |
| 2013/0007139 A1* | 1/2013 | Bombacino | .......... | G06Q 10/107 |
| | | | | 709/206 |
| 2013/0031185 A1* | 1/2013 | Wyatt | ................ | G06Q 10/107 |
| | | | | 709/206 |

OTHER PUBLICATIONS

Navarro et al., "Supporting context-aware collaborative learning through automatic group formation", A: Ubiquitous Computing & Ambient Intelligence. "Ucami2010". València: 2010, (pp. 325-334).
Yannis A. Pollalis, et al., "Using similarity measures for collaborating groups formation: A model for distance learning environments", European Journal of Operational Research, 2009, vol. 193, issue 2, (pp. 626-636).
Mokhtar et al., "A Self-Organising Directory and Matching Service for Opportunistic Social Networking", SNS'10, Apr. 13, 2010, Paris, France, ACM 978-1-4503-0080-3, (6 pages).

\* cited by examiner

- 600: BETH CALLS ALAN ON THE TELEPHONE.
- 601: THE PHONE CALL META-DATA IS EXTRACTED FROM THE VOICE SERVICE AND A NEW THREAD IS CREATED.
- 602: IN THE CONTEXT OF THAT THREAD, BETH SENDS EMAIL WITH AN ATTACHED POWERPOINT TO ALAN AND INCLUDES CAROLYN. THE CONTENT, META-DATA OF OPTIONALLY MULTIPLE COPIES OF MAIL AND ATTACHED DOCUMENTS WHICH ARE EACH EXTRACTED, PARSED, INDEXED, STORED SECURELY AND LINKED TO THE THREAD AS A SINGLE, READ-ONLY DOCUMENT. NEW PARTICIPANTS ARE ADDED TO THE THREAD. PARTICIPANTS ARE NOTIFIED.
- 603: IN THE CONTEXT OF THAT THREAD, BETH SETS UP A CONFERENCE CALL WITH ALAN AND CAROLYN, THE DATA AND META-DATA OF WHICH IS SIMILARLY PROCESSED (AS 602).
- 604: FIRST, IN THE CONTEXT OF THAT THREAD, THE CONFERENCE BEGINS AND ALAN ARRIVES, WHICH IS SIMILARLY PROCESSED (AS 602).
- 605: THEN, ALSO IN THE CONTEXT OF THAT THREAD, CAROLYN ARRIVES, WHICH IS SIMILARLY PROCESSED (AS 602).
- 606: IN THE CONTEXT OF THAT THREAD, ALAN TEXTS BETH, WHICH IS SIMILARLY PROCESSED (AS 602).
- 607: IN THE CONTEXT OF THAT THREAD, BETH REPLIES, WHICH IS SIMILARLY PROCESSED (AS 602).
- 608: IN THE CONTEXT OF THAT THREAD, BETH ARRIVES, WHICH IS SIMILARLY PROCESSED (AS 602).
- 609: NOW, IN THE CONTEXT OF THAT THREAD, BETH, ALAN AND CAROLYN MEET IN CONFERENCE, WHICH IS SIMILARLY PROCESSED (AS 602).
- 610: IN THE CONTEXT OF THAT THREAD, CAROLYN INVITES DAVID TO THE CONFERENCE BY SENDING HIM AN IM, WHICH IS SIMILARLY PROCESSED (AS 602).
- 611: IN THE CONTEXT OF THAT THREAD, CAROLYN ESTABLISH A READ-WRITE STORE AND REVISE THE POWERPOINT, WHICH IS SIMILARLY PROCESSED (AS 602).
- 612: IN THE CONTEXT OF THAT THREAD, CAROLYN SENDS EMAIL TO THE THREAD INDICATING WHAT THEY HAVE DONE WHICH IS SIMILARLY PROCESSED (AS 602). NOTICE THAT SHE DIDN'T NEED TO WORRY ABOUT PROVIDING A LINK TO THE FILE OR THE STORE WHICH ARE KNOWN TO THE THREAD.
- 613: IN THE CONTEXT OF THAT THREAD, BETH SCHEDULES A CONFERENCE CALL THE FOLLOWING DAY BY SENDING AN EMAIL INVITATION, WHICH IS SIMILARLY PROCESSED (AS 602).
- 614: BETH RENAMES THE THREAD.

FIG.6B

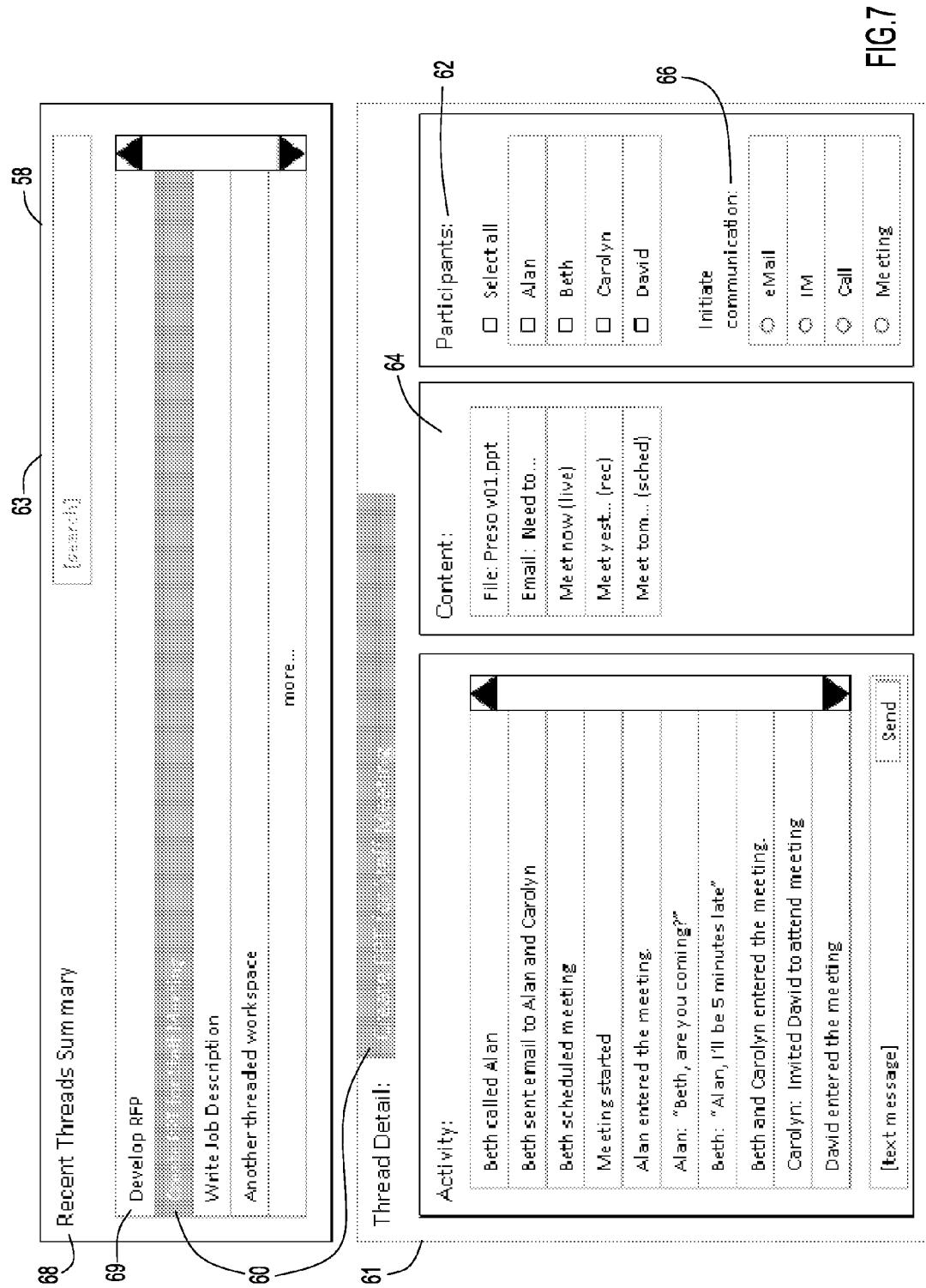

COLLABORATIVE GROUP AND CONTENT MANAGEMENT UTILIZING USER ACTIVATED COLLABORATION THREADS

TECHNICAL FIELD

The present disclosure relates to collaboration between multiple individuals utilizing many different communication and collaboration tools.

BACKGROUND

Collaboration comprises two or more people, e.g., within a group, working toward a common goal. Groups are useful for collaboration, since viewpoints from different people (e.g., people with diverse backgrounds) can be useful to achieve the goal in an efficient manner, with potential problems and solutions being achieved based upon different people joining together to add to the collaboration. A typical collaboration can include a group of individuals, referred to as participants, that work together toward a common goal, live or synchronous communications resources used to communicate and share content, and work product associated with the collaboration (e.g., conversations, documents shared or modified, etc.).

Collaboration software can be utilized to establish a platform in which people, utilizing their computing devices, can communicate with each other, share content and work toward a common goal using various software tools, such as phone calls (e.g., voice over internet or VoIP communications), email, instant messaging, online video conferences, social media, content management systems, some or all of which may include sharing of documents and other content, etc. Some challenges associated with a collaborative platform are defining and managing groups that are collaborating as well as the common goal associated with a collaborative group. Historically, there have been certain approaches to this, such as manual group administration (e.g., one or more group participants set up a community or workspace or group within a collaborative platform and identify members, send invites to the community or group, uploads and curates content, etc.), and automatic generation of groups utilizing intelligent semantic analysis of communications and content within a collaborative platform (e.g., operations performed at one or more servers hosting a collaborative platform that attempt to identify users within the platform that may be linked to the same collaborative effort based upon communications between users and common content within such communications). These approaches can be either labor intensive (if handled manually, e.g., by an individual of a group or a system administrator) or potentially yield inaccuracies or unexpected results in groups of people and/or collaborative goals when automated (e.g., based upon how semantic analysis is performed, whether algorithms analyzing communications between people and related content are reliable or accurate in providing an effective result). Because both manual and automated systems are far from ideal, personal productivity tools are still the norm for a vast majority of ad-hoc or casual collaboration, where even if content is shared, the tools are not aware of each other or the goal. Email threads, for example, appear to be shared and do represent a conversational thread; however, it's actually copies that are shared and the thread is implied. Content shared in email that would be useful context for collaboration on the phone or in meetings remains locked in an email-only silo. And every time new tools or devices are used in a collaboration over time, the "thread" is broken. Meetings are scheduled and then occur, but are not associated with the larger goal.

BRIEF DESCRIPTION OF THE DRAWINGS

FIG. 6B is a listing of the same sequence of communications when a collaboration thread service is used in accordance with example systems and techniques as described herein.

FIG. 7 is an example embodiment of a stand-alone user interface displaying a collaboration thread including the communications listed in FIG. 6B, where the user interface is provided utilizing the systems and techniques described herein.

DESCRIPTION OF EXAMPLE EMBODIMENTS

Overview

Figure 1:
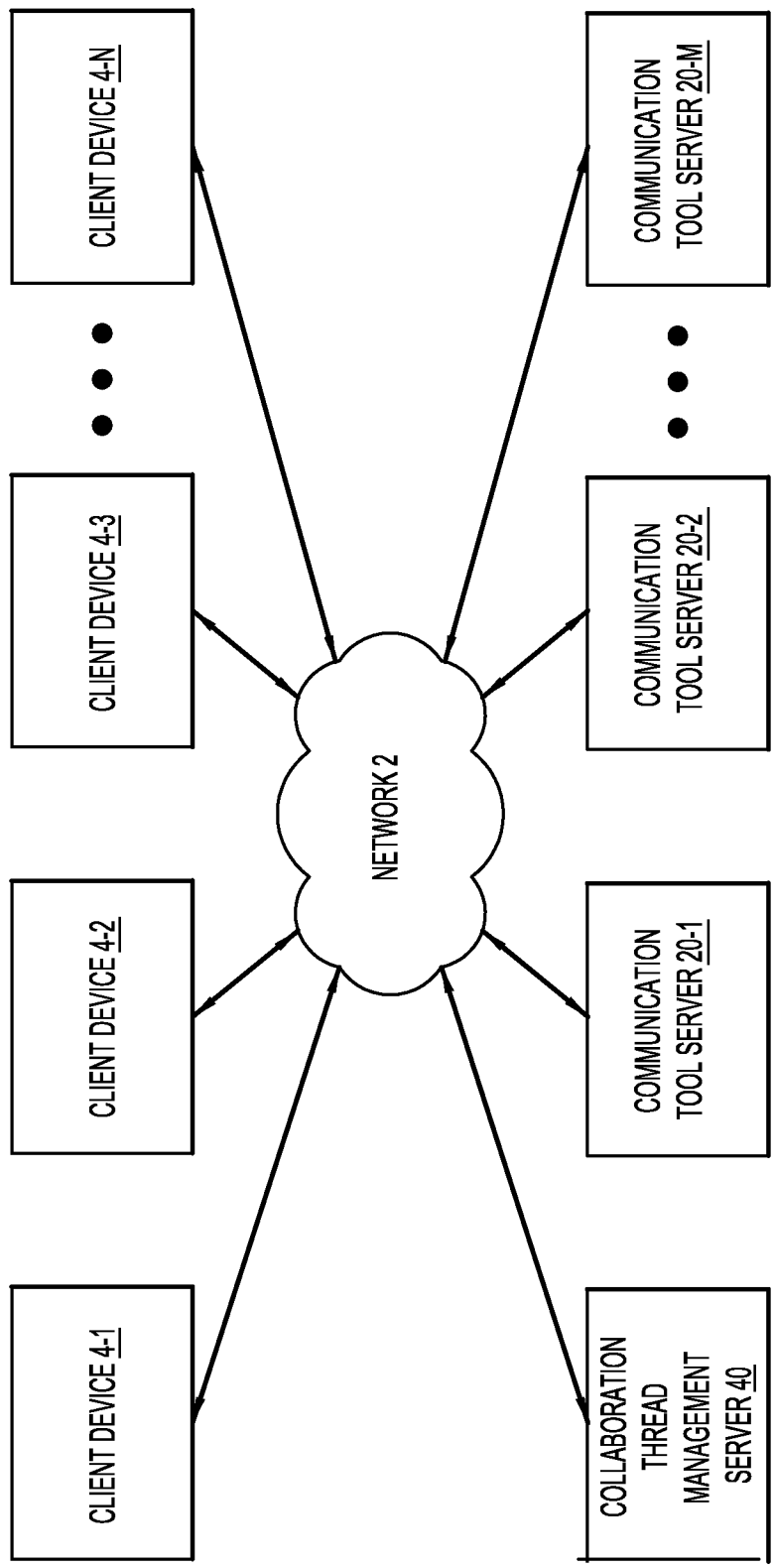
FIG. 1 is a schematic block diagram of an example system that facilitates the implementation of collaboration threads for access to content associated with communications of various types for collaborative groups of participants at client devices and utilizing communication tool servers.

Systems and techniques are described herein for facilitating capturing, via a server, a communication between a plurality of participants via computing devices of the participants and utilizing a communication tool associated with the computing devices. The server links the communication to a collaboration thread that is accessible by each participant via a computing device of each participant, where the collaboration thread comprises a container object that provides access to stored content associated with each communication linked to the collaboration thread. The server further notifies each participant of the collaboration thread including an indication that the collaboration thread has been revised based upon the linking of the communication to the collaboration thread.

Example Embodiments

Techniques are described herein for establishing a collaboration thread for a group of participants, where communications between some or all participants within the collaboration group are easily defined by at least one participant within the group assigning the communication to the collaboration thread (e.g., before or after the communication occurs). Multiple communications occurring over time regarding the same matter can be linked to the same collaboration thread while potentially utilizing different communication tools, rendering it very easy for a collaboration group participant to reference various types of communications utilizing a single reference source instead of having to reference different types of communications separately. Context indicating whether a new communication is part of an existing thread or requires the creation of a new thread is provided either embedded in the communication itself, in native meta-data describing the communication, or in an independent context, distinct from the communication itself linking the identity of the communication with the identity of the collaborative thread. A communication that cannot be associated with an existing thread is given its own, new thread.

Users must select the relevant thread to be associated with any given communication prior to initiating the communication. All communications NOT specifying an existing collaborative thread will be linked to a new one. In order to select a thread as context for a communication, an interface thread service is required in one of two modes: either as a stand-alone application with a control interface to a communications tool or as a plug-in interface within an independent communications tool. This same view can be used to merge threads so that an independent communications in separate threads can be associated with a pre-existing thread post-facto.

As used herein, the term "collaboration thread" comprises a container object supported by a server and a collection of services that together log collaborative events, such as communications between participants within a collaboration group, and provide easy access to content associated with such collaborative events. The content includes any and all types of information or data associated with each communication linked with the collaboration thread, including meta-data associated with the communications. A collaboration thread management server and associated services provide views of the collaborative threads containing communications meta-data and links to content (e.g., documents shared as attachments or in any other form within a communication, links to Internet or web based content, synchronous audio and/or video content associated with a meeting, content from an email, instant message, etc.) within a user interface operable by a computing device of each participant. As described herein, the content can be arranged in a historical or chronological manner, where links of content in the thread can be to content associated with different types of communications (e.g., emails, instant messages, recorded video conference sessions, phone calls, etc.). Content links can also be arranged according to relevance (based on activity dates, number of participants, size and quality of content, for example) using conventional search scoring algorithms.

The term "tool" is used herein to refer to one or more "application" software functions or sets of functions provided by one or more software applications on one or more computing devices and/or servers that support services associated with the computing devices, including operation and management of collaboration threads, facilitating various types of communications between participants of a collaborative group (e.g., email, instant messaging, voice over IP (VoIP) phone call communications, online video conferencing, etc.) as well as the sharing of documents or other content associated with such communications.

An example embodiment of a system in which the techniques of establishing a collaboration thread and linking communications to the collaboration thread (based upon designation by one or more participants within the collaborative group) is depicted in FIG. 1. A plurality of client devices 4-1, 4-2, . . . , 4-N (where N can be any selected number), comprising computing devices of one or more various types, connect via a network 2 to communicate with each other using various types of tools that are hosted by communication tool servers 20-1, 20-2, . . . , 20-M (where M can be any selected number). In addition, a collaboration thread management server 40 is also provided to facilitate operations associated with operation and management of collaboration threads as described herein. An example embodiment of the system architecture for the system, in which client devices 4-N communicate at the front end with the collaboration thread management server 40 and communication tool servers 20-M communicate at the back end of the collaboration thread management server 40 is described herein in relation to FIG. 4.

The network(s) 2 facilitate communications and exchange of communications and content between the client devices 4-N, communication tool servers 20-M and the thread server 40. Examples of types of networks that can be utilized within the system depicted in FIG. 1 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

Figure 2:
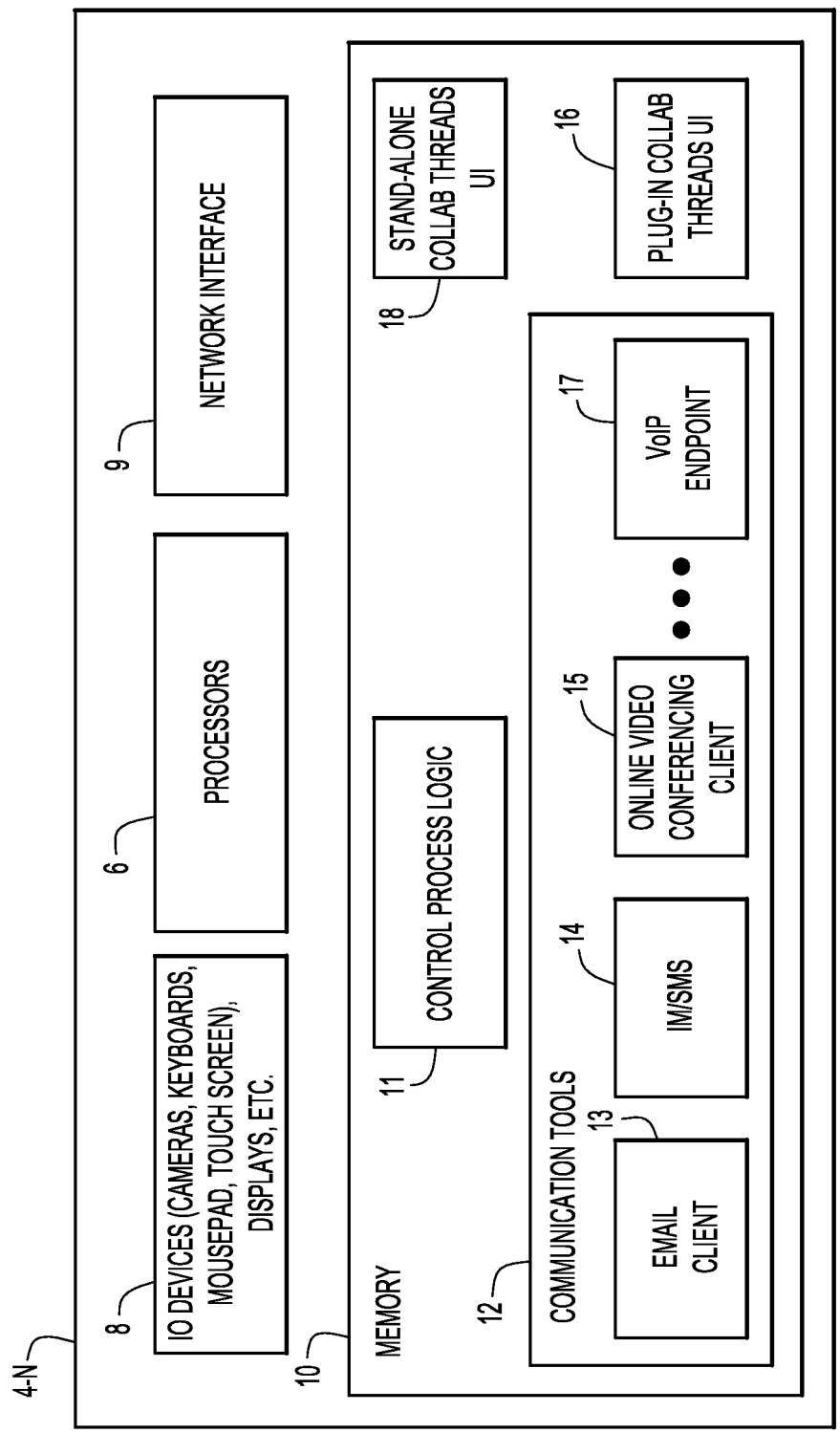
FIG. 2 is a schematic block diagram of an example embodiment of a client device for the system of FIG. 1.
Figure 3:
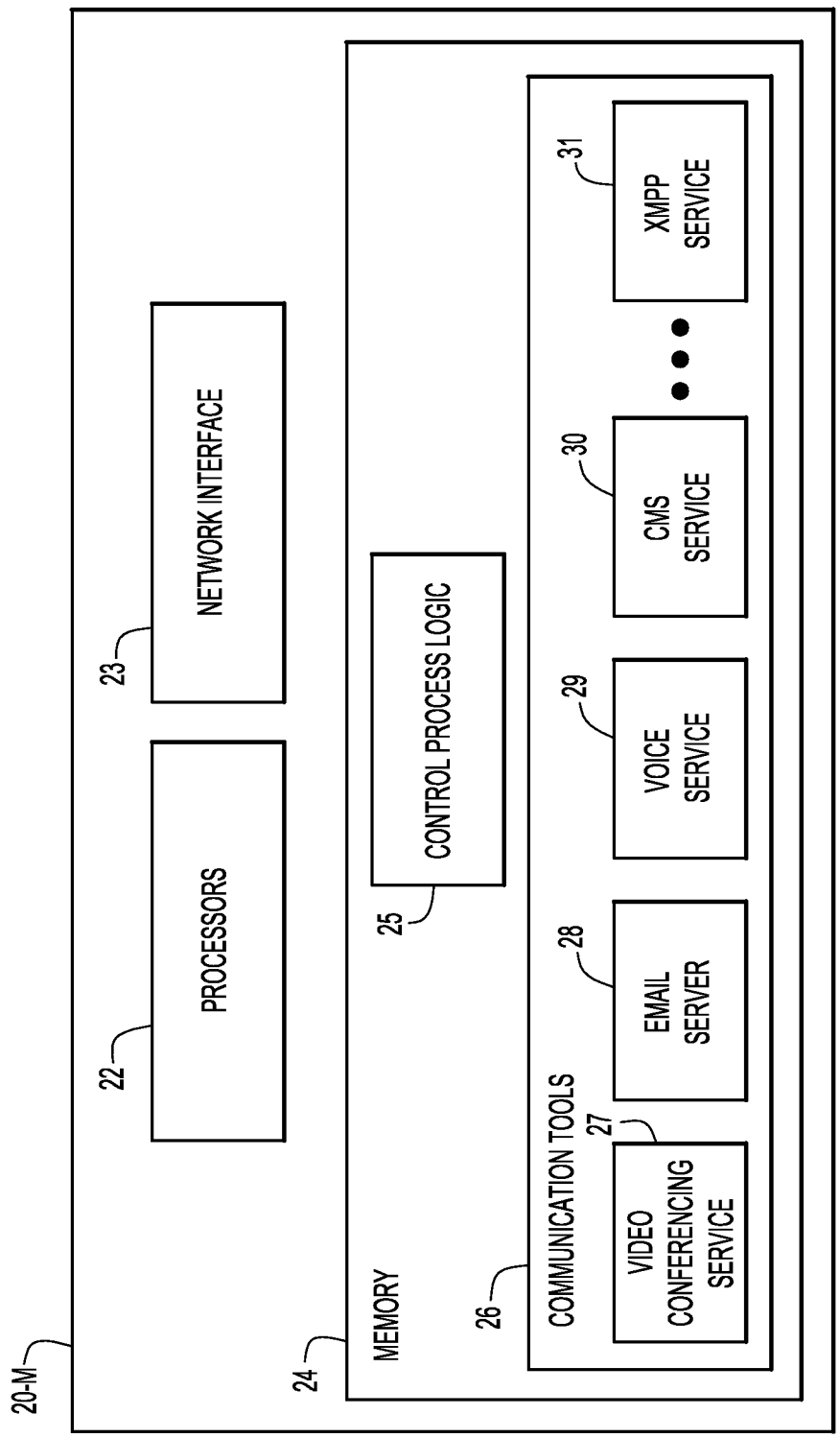
FIG. 3 is a schematic block diagram of an example embodiment of a communication tool server for the system of FIG. 1.

An example embodiment of a client device 4-N is depicted in FIG. 2 and includes one or more processors 6, any suitable input/output (I/O) devices 8 that include, without limitation, one or more cameras, keyboards, mousepads/touch screens, displays (e.g., LCD displays), microphones, audio speakers, etc. to facilitate input and output of content and exchange of communications or other information between a participant utilizing the client device 4-N and other client devices 4-N over the network 2 and utilizing tools supported by one or more communication tool servers 20-M. The client device 4-N also includes a network interface 9 and a memory 10. The network interface 9 can be, for example, one or more of an Ethernet interface card or switch, a modem, a router or any other suitable hardware device that facilitates a wireless and/or hardwire connection over the network(s) 2 with client devices 4-N, server devices 20-M and the service layer 40. The processor 6 can comprise at least one microprocessor that executes control process logic instructions 11 stored within memory 10 including operational instructions and software applications stored within such memory. The memory 10 may comprise read only memory (ROM), random access memory (RAM), magnetic disk storage media devices, optical storage media devices, flash memory devices, electrical, optical, or other physical/tangible memory storage devices, and any combinations thereof.

The memory 10 of the client device 4-N includes a communication tools module 12 comprising one or more software application tools that facilitate connection with one or more communication tool server(s) 20-M that host collaboration communications between client devices. In particular, the communication tools module 12 can include software tools comprising one or more software applications that facilitate the client device 4-N (via one or more host servers 20-M) engaging in communications such as email 13, VoIP or conventional voice communications 17, online video conferencing 15, instant messaging (IM) and/or short service messaging (SMS) 14, etc. It is noted that each of these software tools includes a suitable user interface (UI) that can be displayed by the client device 4-N to facilitate a participant at the client device 4-N engaging in communications with other client devices 4-N over the network(s) 2 using the tool, where the UI also provides interactive control features for the participant that are facilitated by the communication tool. It is noted that the different types of communications can be hosted by different communication tool servers 20-M, such that email may be hosted utilizing one software tool (e.g., Microsoft Outlook software provided by Microsoft Corporation), VoIP communications may be controlled by another software tool (e.g. Cisco Unified Communications Manager, or Cisco UCM, via JTAPI), online video conference sessions may be hosted by another software tool (e.g., Webex software and services provided by Cisco Systems, Inc.), etc. Alternatively, the different types of communications can be hosted by one or more common servers 20-M within a single collaborative networking platform (e.g., Webex Social collaborative platform provided by Cisco Systems, Inc.).

In addition, the communication tools module 12 includes two alternative configurations of a collaboration thread user interface: one as a plug-in 16 which executes as a component of a communication tool 13-17 and another as a stand-alone application 18. Either form of this interface enables participant control and management of collaboration threads hosted by the thread server 40, including selection of a specific collaboration thread to which content from a communication session for a communication tool is to be linked utilizing the techniques as described herein. In either form, the stand-alone collaboration thread UI 18 or the plug-in collaboration thread UI 16 is capable of initiating communication through an exposed API on the one or more communications tools 12 or through a direct API to the communication tool servers 20-M.

Each communication tool server 20-M includes one or more processors 22 (e.g., one or more microprocessors), a network interface 23, and memory 24 including control process logic instructions 25 that are executed by the processor(s) 22 (where the memory 24 may comprise read only memory (ROM), random access memory (RAM), magnetic disk storage media devices, optical storage media devices, flash memory devices, electrical, optical, or other physical/tangible memory storage devices, and any combinations thereof). The server 20-M includes a communication tool module 26 including one or more software applications that facilitate hosting of one or more types of communications that are engaged in between client devices 4-N over the network(s) 2. For example, the server 20-M can host a single type of communication (e.g., email) or, alternatively, host (alone or in combination with other servers 20-M) multiple types of communications (e.g., two or more of email, VoIP, online video conferencing, IM, etc., such as within a collaborative networking platform). Examples of one or more host communication tools that are provided within the module 26 include a video conferencing tool 27 for hosting video communications between client devices 4-N, an email tool 28 for hosting email communications between client devices 4-N, a voice tool 29 for hosting VoIP or other voice communications between client device 4-N, etc. The tool module 26 also includes a content management system (CMS) 30 to manage content associated with communications (e.g., content that is linked with collaborative threads as described herein). The content associated with communications can include, e.g., email content (e.g., email communications being saved individually and/or in email communication threads), IM content (e.g., the content in individual IMs and/or in larger IM threads), online video conference content (e.g., recorded video conference sessions), and any documents, files, attachments, etc. associated with the communications. Further, the module 26 includes an XMPP tool to facilitate real-time delivery of communications (e.g., IM) and content (e.g., presence management) associated with client device 4-N. Any other suitable tool(s) can also be provided to facilitate exchange of communications and content associated with such communications in any suitable format (e.g., REST, SOAP, HTTP, etc.).

Some examples of client devices 4-N that can be utilized in the system of FIG. 1 include, without limitation, stationary (e.g., desktop) computers, personal mobile computer devices such as laptops, note pads, tablets, personal data assistant (PDA) devices, and other portable media player devices, and cell phones (e.g., smart phones) including suitable input and output devices as described above. The client devices and servers can utilize any suitable operating systems (e.g., Android, Windows, Mac OS, Symbian OS, RIM Blackberry OS, Linux, etc.) to facilitate interaction, engaging in communications and other activities, including sharing of content, between client devices 4-N as well as interacting with the collaboration thread server 40 over the network(s) 2 as described herein.

Suitable communication tool server devices 20-M can be any suitable types of stationary or other types of computing devices capable of hosting and managing multiple communication sessions of one or more types simultaneously as well as other large flows of data associated with such communication sessions. Each server device 20-M can be configured to provide the function of handling and transferring communication messages (e.g., email messages, VoIP calls (e.g., utilizing Cisco UCM via JTAPI), synchronous audio and/or video conferencing content, instant or SMS messaging, etc.) between two or more client devices 4-N over the network(s) 2. Each server device 20-M can also be provided with suitable memory capacity to store content associated with communications (e.g., saved email messages, instant messaging or SMS communications, synchronous audio and video content associated with online video conference sessions, and document, files, or any other types of content provided as attachments or in any other manner with communications).

Figure 4:
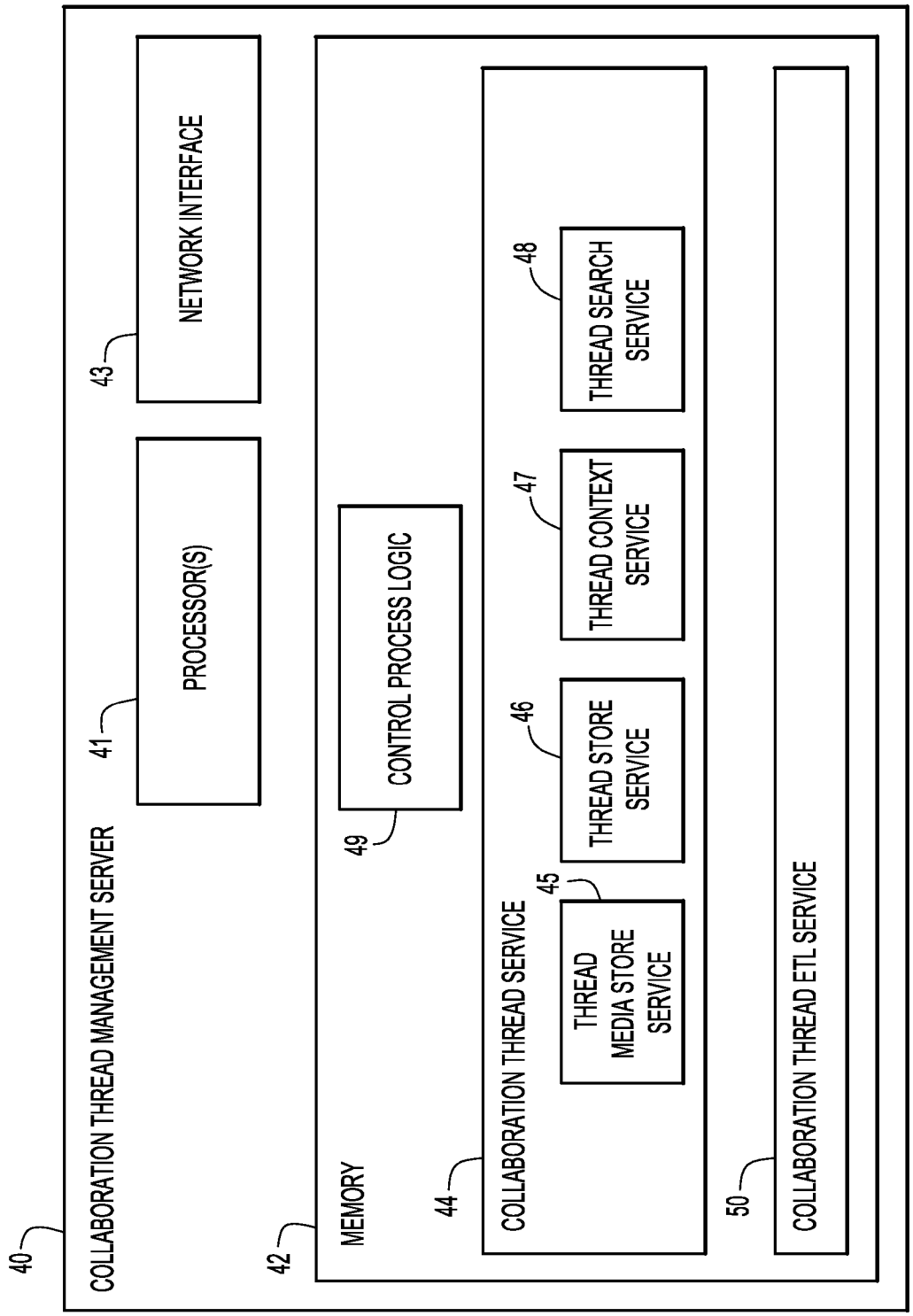
FIG. 4 is a schematic block diagram of an example embodiment of a collaboration thread management server for the system of FIG. 1.

An example embodiment of a collaboration thread management server 40 is depicted in FIG. 4 and includes one or more processors 41, a network interface 43 and a memory 42, all of which can be the same or similar to those previously described in relation to the client devices 4-N and communication tool servers 20-M. The processor(s) 41 executes control process logic instructions 49 stored within memory 42 including operational instructions and software applications stored within such memory. The memory also includes a collaboration threads service module 44 and a collaboration threads extract/transform/load (ETL) service module 50 that facilitate performance of operations by the server 40 as described herein. The collaboration threads service module 44 includes one or more software applications that provide a thread media store service 45, a thread store service 46, a thread context service 47 and a thread search service 48 all of which are described herein in relation to operations of the server 40.

An example embodiment of a system architecture for supporting integration of collaboration threads by the server 40 across different client devices 4-N and communication tool servers 20-M is described with reference to FIG. 5. Each client device 4-N engages in communications sessions with other client devices 4-N via a communication tool server 20-M. Each client device 4-N is also provided with one or more stand-alone collaboration thread UI applications 18 or application plug-in components 16 that provide a front end interface to facilitate communication and interaction with the collaboration thread server 40. Additionally, each communication tool server 20-M is provided with one or more software communications tools providing a back end interface or API to facilitate communication and interaction with the collaboration thread server 40.

In particular, all collaborative content, including any metadata associated with such content, in relation to a communication session (e.g., the content and metadata associated with an email, the recorded audio/video content, as well as any other content and metadata, associated with a video conference session) is captured from the communication tool server 20-M by the collaborative thread ETL service 50 within a thread server 40 (e.g., one or more software applications associated with the server 20-M and the server 40 that facilitate the exchange of information and data via any suitable format including, without limitation, REST, SOAP, HTTP, and XMPP). This occurs for each communication for clients and communication tool servers that subscribe to and are associated with the thread server 40. Content (if it was recorded and available) and meta-data from each of the communication tool servers 20-M is stored as read-only documents in the thread media store service 45 and is also indexed and stored for information retrieval in the thread search service 48. Thread meta-data is stored in the thread store service 46, and links connecting communications content and meta-data with the thread are stored in the thread context service 47. Each of these services 45-48 contain data stores to persist data required by that service.

Each client device 4-N utilizes a front end interface (e.g., one or more software applications for exchanging information via any suitable format including, without limitation, REST, SOAP, HTTP, and XMPP) so as to facilitate communication with the thread server 40 to perform certain operations in relation to assignment of communication sessions with other client devices to specific collaboration threads, as well as accessing collaboration threads and retrieving content associated with such collaboration threads.

As previously noted, each communication that occurs within the system is identified and associated with a new or existing collaboration thread by the user. This can be accomplished several ways but all of them begin with the user selecting a thread from a list of recent threads and indicating in some manner the intention to communicate on that thread utilizing a tool. The intention and the relationship between the communication and the thread can be encoded in the communication itself (e.g., within the body of an email communication). Alternatively, the relationship between communication and thread can be encoded in meta-data (e.g., within an address of an email). Further still, the relationship between communication and thread can be stored in a distinct context service 47 that associates identifying information about the communication with the identity of the thread. The actual linking occurs automatically at the back end interface between a communication tool server 20-M and the thread server 40 utilizing the collaboration thread ETL service 50.

Thus, the system allows each participant of the communication to assign the communication to a specific, existing collaboration thread prior to initiation of the communication. For example, a participant sending a scheduled meeting, an email, an IM or a request to engage in an online video meeting to one or more other participants in relation to a particular "matter" may request, via a user interface (e.g., a plug-in collaboration thread UI 16 or a stand-alone collaboration thread UI 18) within the communication tool at the participant's client device 4-N, that the collaboration thread management server 40 assign and link this communication with an existing collaboration thread in relation to this matter. If no participant requests a linking of the communication to an existing collaboration thread, the communication is still captured and linked to an original or new collaboration thread such that the content of the communication can still be accessed by participants at a later time.

Communications and their content can be linked to a collaboration thread after the fact as well by merging or cloning and merging a collaboration thread with another one. For example, in a scenario in which a participant desires to add a communication to an existing thread after the communication has been linked to a new thread (e.g., due to the content of the communication changing over the course of the communication to become more relevant to a particular thread), the new collaboration thread assigned to the communication can be merged by the participant (e.g., utilizing application 16 or 18 at the client device 4-N) with the desired existing thread. Some or all of the communications from an existing thread can further be cloned by a participant who may wish to start a new collaboration thread (e.g., for a different group of participants, where it is desired to add some or all of the communications and related content from the existing thread to the new thread). The linking by a participant of the communication to an existing collaboration thread at some point before or after the communication results in the communication being linked with other relevant communications for the collaborative project so that all content generated by communications can be easily referenced at a later time by any participant simply accessing the collaboration thread via a suitable user interface of a communication tool at the client device 4-N of the participant.

A thread search service 48 of the thread server 40 is provided at the front end interface for access and use by each client device 4-N. The thread search service 48 provides a "recent threads" list of existing collaboration threads in addition to a relevance-ranked retrieval of collaboration threads to client devices (e.g., based upon recent usage of such collaboration threads) as well as search features that allow participants at client devices to search for collaboration threads and relevant content with additional, user provided "search terms" at any given time (e.g., searching for collaboration threads which may not be within a "recent" or relevancy-ranked listing provided by the service layer 40 to client devices 4-N). A collaboration threads ETL service 50 is provided at the back end interface for access and use by communication tool servers 20-M, where communications meta-data as well as communications content (text, audio and video content) are extracted, indexed and linked to new or existing collaborative threads as defined above.

It is noted that one or many instances of each component of the collaboration thread management server 40 (e.g., ETL service 50, media store service 45, thread store service 46, thread context service 47 and thread search service 48) can be hosted by one or more servers, where each of the servers of the service layer 40 can further be configured in a similar manner with any suitable hardware components as servers 20-M.

Figure 6A:
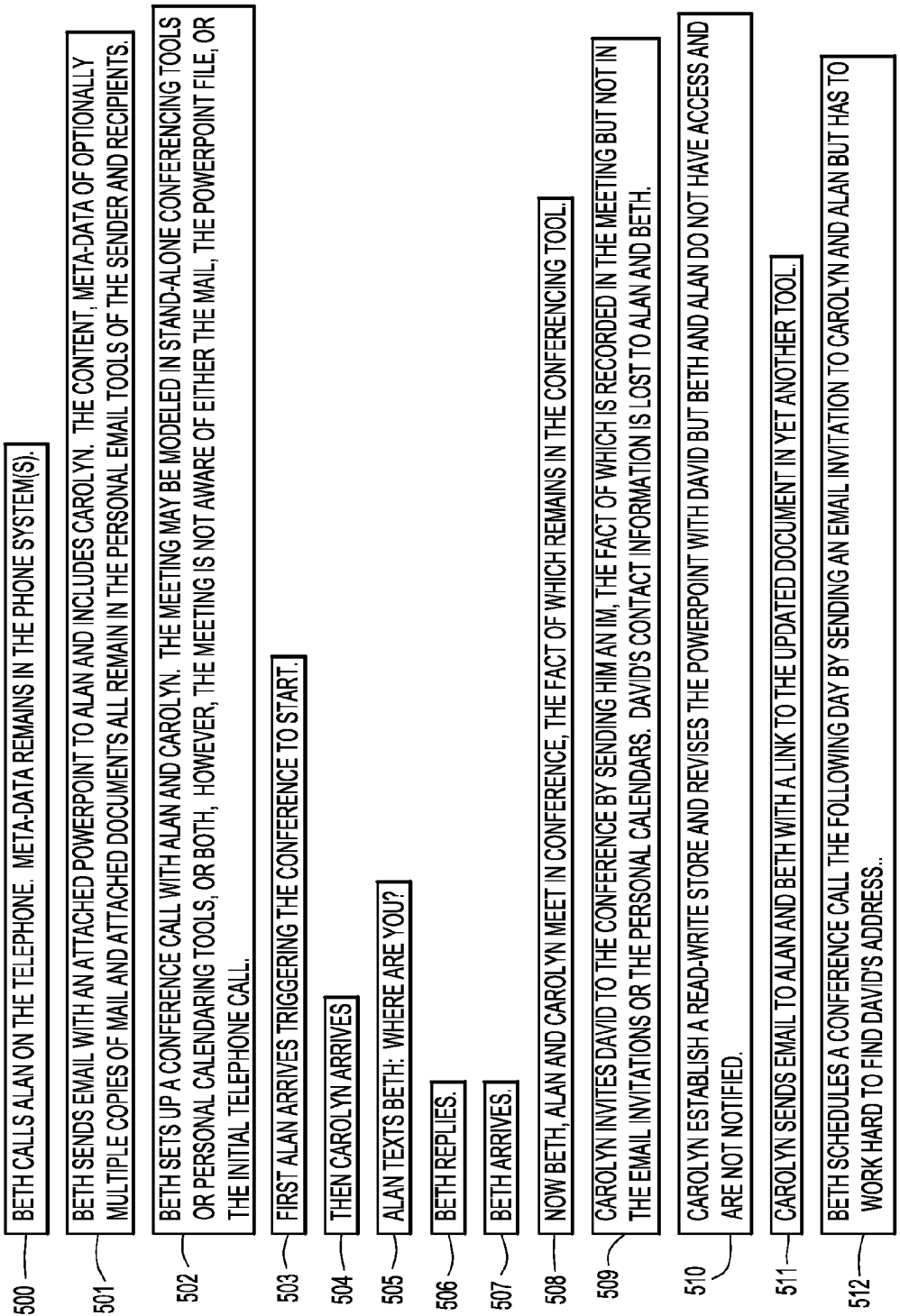
FIG. 6A is an example listing of different types of communications that can occur in a collaborative effort between participants in a given day without the benefits of a thread server.

The system described and depicted in FIGS. 1-4 facilitates establishing collaboration threads between participants that link a series of multiple communications across multiple communication tools in a highly useful and efficient manner. This is in contrast to typical scenarios, in which many communications are set up in an ad hoc manner, and it is difficult to link one type of communication with another that may be related. To illustrate the difficulties associating a series of different types of communications utilizing different tools in a collaborative effort between participants, an example embodiment is depicted in FIG. 6A, in which a series of related communications between participants occurs within a given day that comprise a collaboration, at least conceptually, although the communications remain fragmented and unconnected. In the morning of a given work day, Beth calls Alan (at 500, utilizing a first communication tool, e.g., a VoIP communication device supported by a communication tool server) to discuss a topic. Later in the morning, Beth sends an email to both Alan and Carolyn (at 501, using a second communication tool, where a new person is identified in the previous call between Alan and Beth who may be helpful with their project goal) including one or more attachments. Shortly after the email, Beth sets up a video conference with Alan and Carolyn (at 502, using a third communication tool, an online video conference meeting supported by a communication tool server), and later that day the three meet in the video conference (at 503-507). During the conference, Carolyn sends an IM (at 509, a fourth communication tool) to David inviting him to join the conference. Note that, while Carolyn, Beth and Alan's contact information was recorded in the calendar event and was used in the conference, David's address only appears in the conference. Thus, Beth or Alan may not have David's contact information. Close to the end of the business day, Carolyn and David conduct an ad hoc meeting to revise the documents (at 510), and a cloud hosting file storage service (e.g., Dropbox™ by Dropbox, Inc.) must be set up manually to share the revised documents with all participants in the expanded collaborative group. Alan, Beth, Carolyn and David all must be notified of the new store with a link to the document (at 511, e.g., utilizing an email). Still later in the day, Beth schedules another video conference session with all participants of the group (at 512). With Beth not having David's contact information (since Carolyn added David to the collaborative group), Beth must perform additional searching to find David's contact information in order to invite David to the video conference session.

In the example scenario as set forth in FIG. 6A, there is no easy way utilizing typical communication tools to collect all communications for easy access by any of the participants within a single reference source. It may be possible, for instance, for all email communications to be combined in a single thread (by each participant responding to all other participants whenever an email is sent, so as to create an email chain including all emails within the chain). However, even in this situation, it is possible not all emails associated with this collaborative effort will exist in a single email thread or chain (e.g., Alan may respond to all in relation to an email sent by David, and Beth may also respond to all in relation to the same email by David shortly after Alan's email; the emails by both Alan and Beth would be in divided chains). Alan, who joins the process later than Carolyn, Alan and Beth cannot be included retroactively in communication that was shared prior to his entry in the process. In addition, since multiple communication tools were used, there is no easy way utilizing conventional systems and associated services to link one communication for one communication tool with another communication for another communication tool. For example, the online video conference may be recorded utilizing a video conferencing tool and a host server that supports the video conference, but this would be separate from email communications or IM communications as well as any attachments associated with such communications. Any shared resource such as the file in Dropbox must be administered and uploaded manually assuring that most content remains trapped in personal productivity tools. It becomes even more difficult to collect all communications associated with a collaborative effort after a certain amount of time has elapsed since the most recent communication or activity associated with the effort. In this scenario, it may be very difficult for any of the participants in the group to go back and find some or all of the communications associated with the collaborative effort after a month or so has elapsed since the last activity.

The systems and techniques described herein provide an easy mechanism for linking communications from various communication tools that are all associated with the same collaborative effort within a single reference tool comprising a collaborative thread that is accessible by identified participants associated with that collaborative thread. In addition, the linking of communications with the correct collaborative threads is rendered in a simple and very reliable manner by allowing participants of the communications to select the collaborative thread to which a communication will be assigned and linked. This feature overcomes the administrative difficulties of having one or more system administrators manually attempting to associate large volumes of contact information and communications meta-data and content for sharing with collaborative groups and also the difficulties with finding suitably reliable algorithms for scanning and automatically associating content with collaborative groups, since the association of a communication with a collaborative thread can be made at the outset (e.g., at the start or end of the communication) by a participant of the collaborative group. For comparison, the example scenario in which the same communications take place is depicted in FIG. 6B, where these communications are linked to a collaborative thread utilizing the systems and techniques described herein.

In particular, when Beth calls Alan in the morning (at 600), meta-data from the call is extracted from the voice service 29 to create a new thread (at 601) and a notification served to Alan and Beth. In the context of that thread, Beth sends email with attachment(s) to Alan and includes Carolyn, and the content, meta-data of optionally multiple copies of mail and attached documents which are each extracted, parsed, indexed, stored securely and linked to the thread as a single, read-only document (at 602). Beth then sets up a conference call in the context of the thread (at 603). Later the meeting occurs with people joining and then engaging in the conference call (at 604-609). Beth sends an IM to David in the context of the thread (at 610), inviting David to join the conference call. David's IM, email and voice addresses are also added to the thread when David (e.g., when David responds to the IM and joins the conference call, becoming a new participant to the collaborative group). Carolyn establishes a read-write store in the context of the thread and revises the documents with David that were associated with the meeting within the store (at 611). Carolyn sends an email in the context of the thread indicating modified documents are at the store (at 612). There is no need to provide an access link to the store, since it is already accessible via the thread. Beth schedules (at 613) another meeting using the thread instead of addressing each participant individually. All participants in the thread receive a notification that the meeting has been scheduled. A link for the meeting appears in the thread. Beth may further decide to rename the thread (at 614) to a more relevant thread name which will be easier to retrieve utilizing the thread search service 48.

Figure 5:
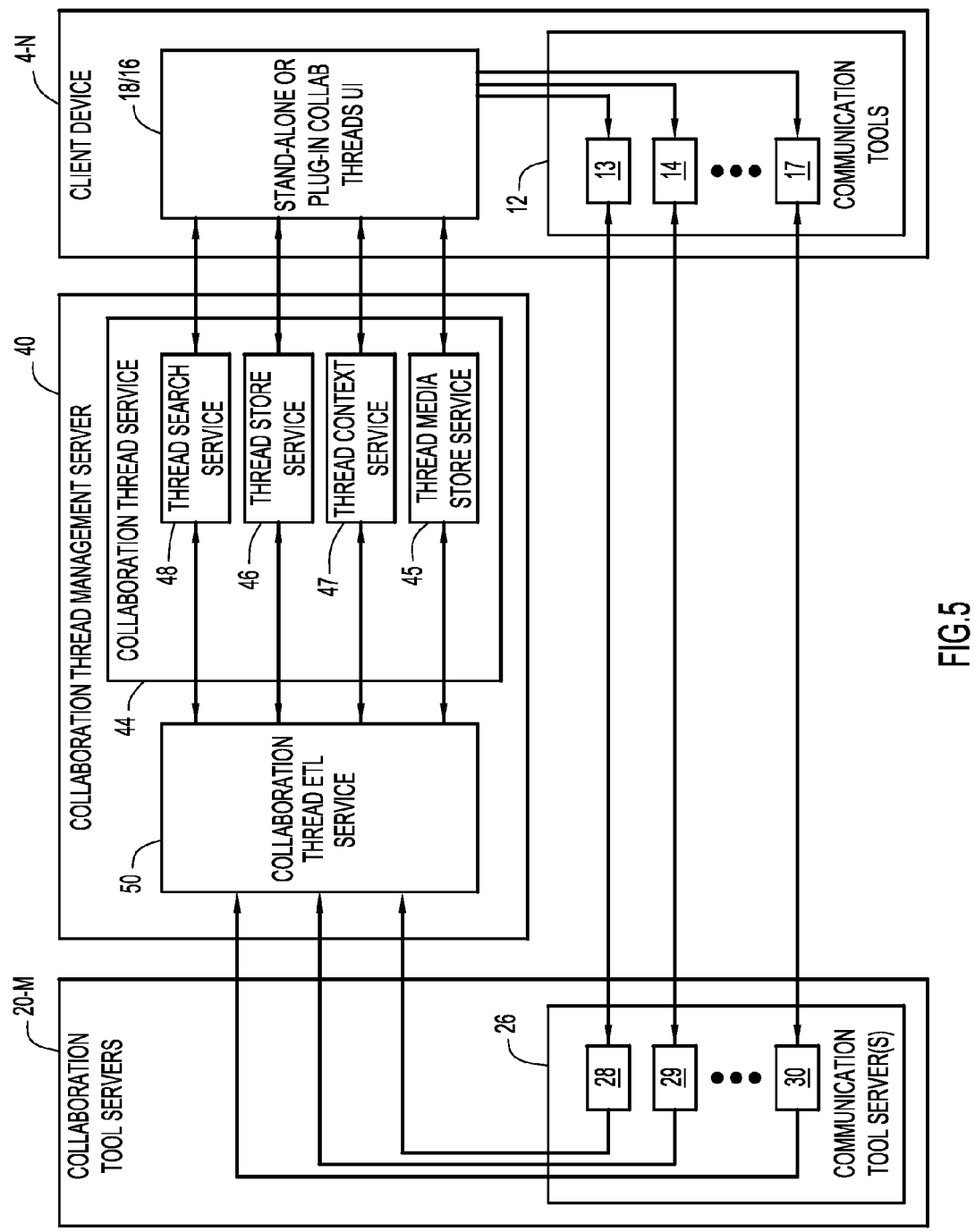
FIG. 5 is a schematic block diagram of an example embodiment depicting communication sessions between client devices and components of a collaboration thread servicer and communication tool servers for the system of FIG. 1.

An example scenario of establishing a collaboration thread utilizing the system architecture of FIG. 5 is described with reference to a user interface schematic in FIG. 7, in which the same communications occur as those set forth in the scenario depicted in FIG. 6B. In this scenario, each communication is linked with the same collaboration thread 60 (named "Create PPT for Staff Meeting"), where the linking is initiated by a participant using a collaborative thread UI provided by plug-in module 16 or stand-alone application 18 and associated with each communication tool that supports each different communication in this collaborative effort. The collaboration thread depicted in FIG. 7 provides a general representation of what a display at a client device 4-N may provide to a participant via a collaboration thread UI 58 provided by UI plug-in module 16 or stand-alone application 18 in relation to the collaboration thread 60 for a particular communication tool. For example, in relation to an email tool (e.g., Microsoft Outlook), the module 16 can integrate a collaboration thread UI with the interface for the email tool so that a participant can reference collaboration thread 60 (as well as other collaboration threads) within this email tool and can further access content associated with communications utilizing this communication tool as well as other communication tools via the collaboration thread 60. In an embodiment of a collaboration platform in which one or more collaboration servers support multiple communication tools, the collaboration thread UI provided by UI module 16 can be integrated with an interface for the client device 4-N to facilitate access to the collaboration thread 60 and other collaboration threads by a participant within the collaboration platform.

The user interface provides other features of the collaboration thread 60, such as a window 62 that lists all collaboration participants and a window 64 that lists the content associated with the communications linked with the collaboration thread 60. Since the content of the communication stored in the media store service 45 of the thread server 40 includes all content associated with a communication, including meta-data providing information about participants (various types of contact information, participant profile information, etc.), the user interface can also be configured to allow a participant to contact any other participant associated with the collaboration thread from the user interface. A series of controls to initiate communication 66 along with controls to address each participant 62 to initiate communication with any combination of participants in the context of the thread. For example, the participant can contact one or more participants by a phone call (e.g., VoIP communication) by selecting those participants and then initiating a phone call with the phone call control 66, or contact a participant utilizing another communication tool (e.g., email or IM) utilizing other icons 66. The information associated with each collaboration participant can be obtained from metadata associated with participant information (e.g., provided at the back end interface from one or more communication tool servers 40-M to the service layer 40 when a communication is linked by a participant with the collaboration thread 60). Participants, their address and the content of their communications in the context of the thread simply accumulates in the thread; participants are no longer required to maintain their own personal group lists or contact information for each participant.

The content window 64 provides a listing of content associated with the collaboration thread 60 which is stored in the thread store service 46 and optionally the media storage service 45 of the thread server 40. The content window 64 provides a link to accessing each item of content by the participant (e.g., emails, documents such as a slide presentation, a link to a video conference session, etc.), where the participant can simply select the item content, e.g., by clicking on the content item within the window 64. Content meta-data with the location of the content associated with a communication is stored by the thread store service 46 (e.g., attachments such as documents, images, or any other types of content associated with communications). A copy of that content may be stored directly in the thread media store service 45. Alternatively, content can be stored by external resources (i.e., resources external to the collaboration thread management server 40), where such externally stored media is made available by a link to the externally stored content (e.g., recorded audio and/or video content from a meeting may be stored externally by a meeting server 20-M and a link to the audio and video content is provided to the externally stored content at the collaboration thread). In a scenario in which a content item is associated with a different communication tool or a different application required to open and view a document, the collaboration thread UI provided by plug-in module 16 or stand-alone application 18 facilitates operation of such communication tool or other software application to allow access and viewing of the content at the client device 4-N by the participant. For example, in a scenario in which a participant is viewing the collaboration thread 60 within a collaboration thread UI as a plug-in within an email communication tool (e.g., Microsoft Outlook), selecting content associated with a communication that utilizes a video conferencing tool (e.g., Webex) results in opening a different communication tool to facilitate participation in the real-time meeting by sharing synchronous streams of voice, video, and shared screens or viewing of the recorded video conference with the video conferencing tool after the meeting has ended. When a participant desires to view content such as a document, selecting such content results in opening the software application (e.g., stored locally at the client device 4-N) to facilitate viewing of the content. The content in each scenario is obtained from the thread server 40 via the media store service 45, to the client device 4-N for viewing. The content associated with a communication linked to the collaboration thread 60 can be provided as read only content. If a document associated with a thread is stored in a CMS service 30, it can be linked using a URI to the collaborative thread in exactly the same way content from the media store service 45 is linked except that, in this case, anyone authorized to update the document will be able to do so using the link in the thread to navigate to the document obviating another search in yet another tool.

The collaboration thread 60 is depicted in a summary view in a list of recent threads 68 and also in a detail view 61. The summary view allows a participant to easily navigate from one collaboration thread to another. For example, one mode of viewing the summary view orders threads by recent activity (e.g., collaboration threads associated with more recent communications higher on the list than those with older communications).

The collaboration threads are identified with a descriptive name that can easily be changed or modified by a participant (e.g., utilizing the collaboration thread UI) to identify the collaboration so that it may be easily found within a listing of collaboration threads or by providing additional search terms in a search field 63 utilizing, e.g., the thread search service 48 of the server 40.

Due to the large number of collaboration threads that are generated by the collaboration thread management server 40 (since each communication from a client device 4-N that is associated with or subscribes to the server 40 is captured and linked with a collaboration thread, regardless of whether it is assigned to a specific collaboration thread by a participant), ordering summary threads by how recently they were used is insufficient and the search service 48 is an essential part of this solution for easy access to collaboration threads that are of most relevance to a participant. Referring to the recent threads summary 68, the list of recent threads 69 is relevance ranked within a collaboration thread UI of a communication tool for the client device 4-N of a participant. Relevance factors involving a recent activity for collaboration threads including, without limitation, how recently participants have accessed or added to threads or thread content, how many participants are involved in a thread, how much content has been linked to the thread, whether or not the default name of a thread has been replaced with a custom name, etc. In other words, the order of this list should reflect the likelihood that a thread is to be reused assuming that richer, more recent threads are more likely to be reused than sparser, older ones.

By default communications which are not associated with a thread will be used to generate a new thread which receives a default name. These collaboration threads appear at the top of the "recent" ordered summary listing 76 immediately after they occurred. However, because they only contain one communication, and have not been reused or renamed, they may appear below a richer thread in a relevancy-ranked summary list, even immediately after they were created. Furthermore, a default thread with a single communication may drop off more quickly in the relevancy ranking, particularly in the event these communications never are assigned by a participant for linking with an existing collaboration thread that includes two or more linked communications. In other words, "New Thread" communications may be simply communications that occurred that are not intended to be linked with a collaboration thread that is rich in content, and thus should not be deemed highly relevant.

The search field 63 is provided within the recent threads summary listing 68 to allow a participant to search for one or more collaboration threads of interest based upon any term extracted from the content or meta-data or participants involved in any associated communication. When a user-defined term is used the relevancy score and rank of each thread in the summary view will be recalculated by the server, such that threads where the search term appears in the name of the thread, in the content of the thread or the names of the contacts in the thread appearing above those without the search term. Thus, while the amount of communication content captured and stored by the thread server 40 can be large (since every communication of a participant is captured and linked with a collaboration thread), collaboration threads can be accessed by a participant (e.g., a collaboration thread of interest that is rich in content, in which multiple communications have been linked to the thread) via the search service 48 at the front end interface between client device 4-N and server 40, whether or not the thread has been named explicitly by a participant or by default.

Figure 8:
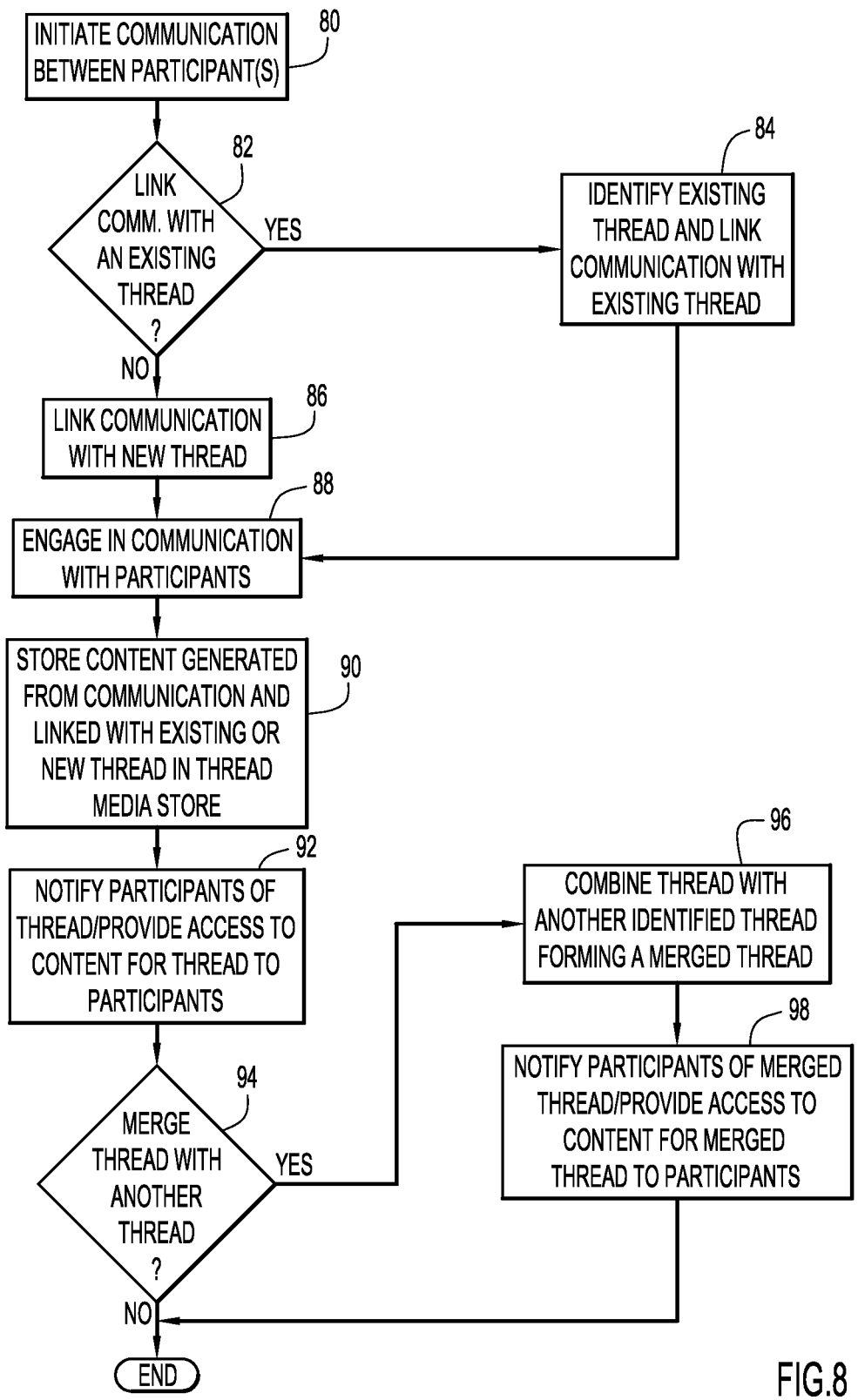
FIG. 8 is a flow chart depicting process steps associated with linking a communication between participants with a new or existing collaboration thread utilizing the systems and techniques as described herein.

An example process for generating a collaboration thread (such as thread 60) within a communication tool at a client device 4-N utilizing the system of FIGS. 1-5 is now described with reference to the flowchart of FIG. 8 and also in relation to a specific example scenario in the information flow diagrams of FIGS. 9A and 9B. Referring to FIG. 8, a communication is initiated between participants at 80. At 82, a participant has the option of linking this communication with an existing thread. If the participant desires to link the communication with an existing collaboration thread, at 84 the existing thread is identified by the participant (utilizing a stand-alone thread UI 18 or plug-in thread UI 16) and the communication is linked with that existing thread based. If no participant initiated link to an existing thread occurs, the communication is still linked with a new collaboration thread at 86. At 88, the participants engage in the communication. At 90, upon completion of the communication, content associated with the communication (including meta-data) is stored in the thread media store service 45 of the collaboration thread service 44 and linked with the thread (either new or existing thread). At any time after a thread is created. At 92, participants are notified of the thread and are provided access to content associated with the thread (including content for all communications associated with the thread). In particular, notification can occur when the thread appears within a new or recent listing of threads for a participant within the thread GUI 16/18 of the participant (e.g., within the Recent Threads Summary window 68 of the GUI 58 depicted in FIG. 7). The participant has access to content of the communication (as well as other communications) of the thread by selecting the thread within the thread GUI 16/18 and viewing content (e.g., as shown in the GUI 58 of FIG. 7).

At 94, at any point in time after the communication has occurred, a participant has the option of merging the thread with another existing thread. In a scenario in which the thread is a new thread (i.e., the communication was not linked with an existing thread at the initiation of the communication), the participant can now link this communication with an existing thread after the communication at 96, and this results in the server 40 combining the thread with an existing thread as identified by the participant to form a merged thread. After forming the merged thread, participants are notified at 98 of the merged thread and are provided access to content associated with the merged thread (including content for all communications associated with the merged thread).

Figure 9A:
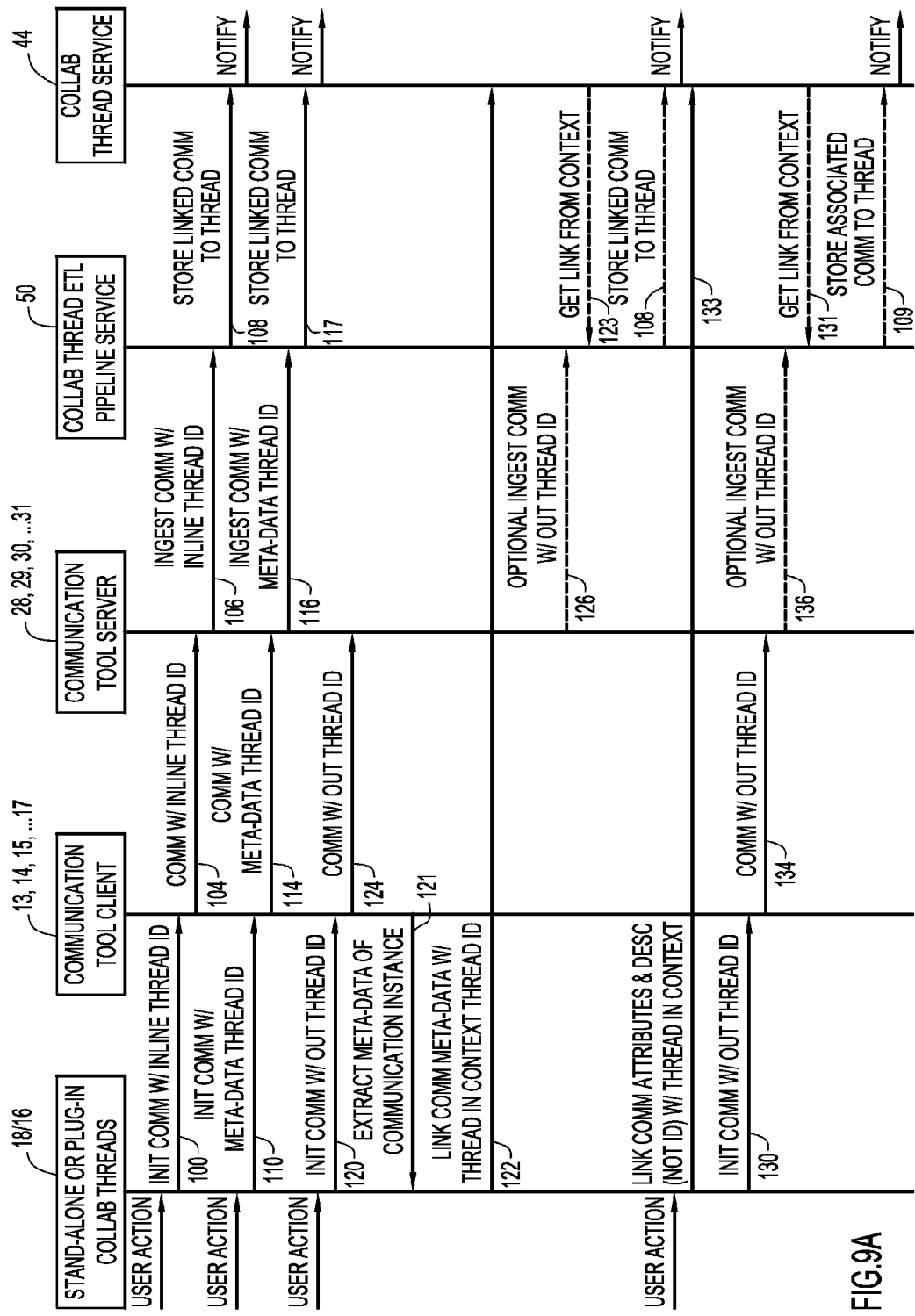
FIGS. 9A and 9B depict a control flow diagram showing an example process for defining and managing collaboration threads utilizing the system of FIG. 1 and the thread serves of FIG. 5 in accordance with example techniques described herein.

The flow diagram of FIG. 9A shows the flow of communications and information between client devices, communication tool servers and the service layer as communications between participants occur and are linked to an existing collaboration thread in four different ways where different methods are used to associate a new communication with an existing thread. In each variant, a participant initiates a threaded communication in the same way as a user action from a thread UI 16/18, where the thread is selected from a relevance-ranked list of threads within the UI 16/18 and, in the context of that selection, a collaboration is initiated.

At 100, a communication is initiated between two or more participants utilizing a communication tool at each computing device 4-N of each participant. A stand-alone 18 or plug-in 16 thread UI on a client device 4-N (e.g., a mobile smart phone) selects a thread and initiates a communication sequence with a communication tool 12 API embedding the thread id in the content of the message itself identified with some kind of mark-up code, for example. In 104 the actual communication is initiated passing the thread id along in the content of the communication. Then when the collaboration ETL service 50 extracts the communication from the communication tool server 26, the thread id, identified by the mark-up code, can be extracted from the communication so it can be ingested at 106, analyzed, indexed, linked and stored in the collaboration thread service 44. Terms from the communication and meta-data are also extracted and indexed for later retrieval in the thread search service 48. Thread meta-data can be updated in the thread store service 46. Any communication content can be stored in the thread media store service 45. In the thread context service 47, context links can associate stored content with the stored thread. In the case of an email, for example, in 104 the id of the thread is encoded in the body of the email. Then, when the collaboration ETL service 50 extracts the communication from the email server 28, the thread can be extracted from the email so it can be ingested at 106, analyzed, indexed, linked and stored at 108 in the collaboration thread service 44. Terms from the email and meta-data are extracted and indexed for later retrieval in the thread search service 48. The entirety of the email can be stored as a document in the thread media store service 45. In the thread context service 47, context links can associate the stored email with the stored thread. Participants in the thread are notified of the update.

At 110, a communication is initiated between two or more participants utilizing a communication tool at each computing device 4-N of each participant. A stand-alone 18 or plug-in 16 thread UI on a client device 4-N (e.g., a mobile smart phone) selects a thread and initiates a communication sequence with a communication tool 12 API embedding the thread id in the meta-data of the message rather than the message body or message content. In 114 the actual communication is initiated passing the thread id along in the meta-data of the communication, using for example a dedicated address for the thread service or an address of the thread or as an embedded tag in a message header. Then, when the collaboration ETL service 50 extracts the communication from the communication tool 26 the thread can be extracted from the communication meta-data so it can be ingested at 116, analyzed, indexed, linked and stored at 117 in the collaboration thread service 44. In the case of an email, for example, in 114 the id of the thread is encoded in the subject or as a 'bcc' address of the email. Then when the collaboration ETL service 50 extracts the communication from the email server 28, the thread can be extracted from the email so it can be ingested at 116, analyzed, indexed, linked and stored in the collaboration thread service 44. Participants in the thread are notified of the update.

At 120, a communication is initiated between two or more participants utilizing a communication tool at each computing device 4-N of each participant. A stand-alone 18 or plug-in 16 thread UI on a client device 4-N (e.g., a mobile smart phone) selects a thread and initiates a communication sequence with a communication tool 12 without using the API to embed the thread ID with the message in any way. At 124, the actual communication is initiated. Instead of embedding the thread ID along in the body or the meta-data of the communication itself, the ID of the communication is obtained by the thread UI 18/16 from the communication tool client 12 and sends an association between the ID of the communication and the ID of the thread at 122 to create an independent context linking the identities of the communication and the thread in the collaboration thread service 44. Then, when the collaboration ETL service 50 extracts the communication from the communication tool server 26 and is unable to identify the associated thread, the previously stored thread context with the associated communication and thread ID can be fetched at 121 from the thread context service 47 in the collaboration thread service 44 using the ID of the communication as a key so that the communication can be ingested at 126, analyzed, indexed, linked and stored in the collaboration thread service 44. In the case of a VoIP session, for example, at 123 the ID of the SIP session is pulled from the VoIP endpoint 17 and used to construct and store a context 122 in the thread service 44. Then when the collaboration ETL service 50 extracts the meta-data and optionally a recording of the phone call from the voice server(s) 27/29, the thread can be retrieved from the context so it can be linked to the call data which is analyzed, indexed, linked and stored in the collaboration thread service 44. Participants in the thread are notified of the update.

At 130, a special case is described in which the ID of the thread cannot be passed along with the communication encoded in meta-data or the body of the communication and the ID of the communication itself cannot be obtained from the communication tool client 12 through an API. In this case, like the other previously noted case, a communication is initiated between two or more participants utilizing a communication tool at each computing device 4-N of each participant. A stand-alone 18 or plug-in 16 thread UI on a client device 4-N (e.g., a mobile smart phone) selects a thread and initiates a communication sequence with a communication tool 12 and cannot embed the thread ID nor can it discover the ID of the communication. At 134 the actual communication is initiated. Instead of passing the thread ID along in the body or the meta-data of the communication itself, and instead of obtaining the ID of the communication by the thread UI 18/16 from the communication tool client 12, a communication context is sent at 133 with the type, date, time and participants of the communication and the ID of the thread to create a context linking several identifying attributes of the communication and the identity of the thread in the collaboration thread service 38. Then when the collaboration ETL service 50 extracts the communication from the communication tool server 26, the previous context can be retrieved at 131 from the context service 47 in the collaboration thread service 44 using those identifying attributes of the communication (date, time and participants, for example) as a key so that communication meta-data (and optionally content) can be ingested at 136, analyzed, indexed, linked and stored in the collaboration thread service 44. In the case of a VoIP session, for example, the SIP addresses of the invited participants and the approximate date and time of the communication are used in lieu of the session ID to construct and store a context 133 in the thread service 44. Then when the collaboration ETL service 50 extracts the meta-data and optionally a recording of the phone call from the voice server(s) 27/29, the context can be retrieved using the SIP addresses of the called parties and the date and time of the call to fetch the context and the thread ID so that the thread can be linked to the call data which is analyzed, indexed, linked and stored in the collaboration thread service 44. Participants in the thread are notified of the update.

Figure 9B:
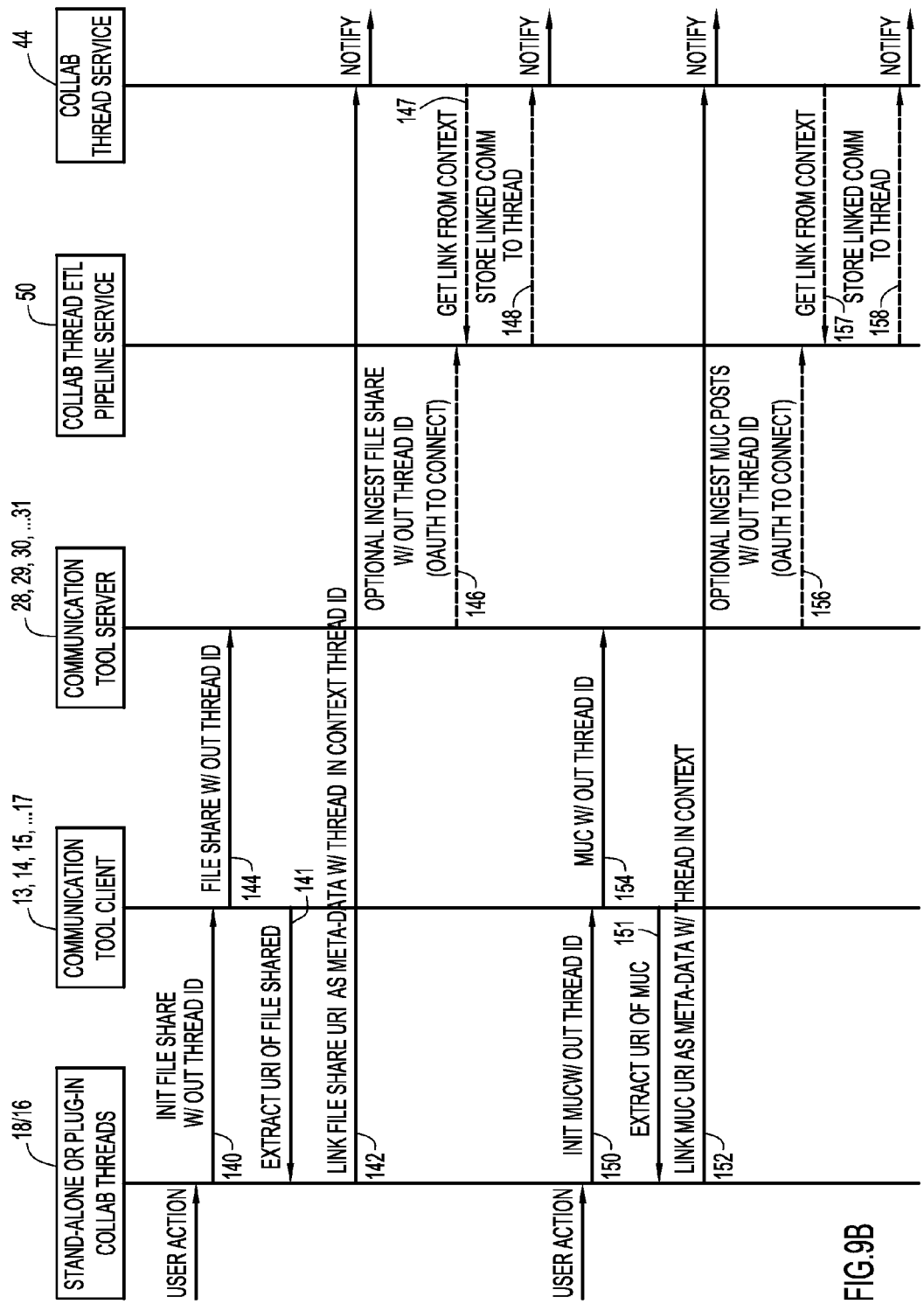

The flow diagram of FIG. 9B shows the flow of communications and information between client devices, communication tool servers and the service layer when a file or a multi-user chat (MUC) session is shared between participants and linked to an existing collaboration thread. At 140, a participant selects a thread and initiates a file share, utilizing the thread UI 16/18 and a communication tool 12 of the client device 4-N. At 144, the communication tool 12 communicates with the appropriate communication tool server 20-M to link a file in a file sharing service (such as Drop Box) with other participants, whether or not they are present at the moment, and a URI associated with the file is extracted at 141. At 142, the participant, via thread UI 16/18, meta-data for the URI is shared in the context of the thread ID with the collaboration thread service 44. Optionally, at 146, the collaboration ETL service 50 extracts the file share communication from the communication tool server (which is, in this case, the file sharing service), the previously stored thread context with associated file URI and thread ID can be fetched at 147 from the context service 47 in the collaboration thread service 44 so that the file can be ingested, analyzed, indexed, linked and stored in the collaboration thread service 44. At 148, the file is linked to the thread. Participants in the thread are notified of the update.

Note that in the simplest case the collaboration ETL service 50 extracts only meta-data from the context and stores it in the thread context service 47, linking the external file to the thread. In such a case there would be no guarantees in this system that the other participants will have access to view the file in this external service, however, even though the external file is linked to the thread. However, if the collaboration thread ETL service 50 is authorized as an administrator and has its own credentials or if the user has authorized access using OAUTH for example, it can extract the shared file from the communications tool server, the file sharing service in this example, index its contents for the search service 48, store a copy in the thread media store service 46 as well as linking its meta-data in the thread context service 47. In this way thread participants will have access to the read-only copy of the file to search for the thread and to read the content whether or not they have access to the file in the external service.

If the container of the shared file in a file sharing service can be addressed with a URI, the service can be permanently associated with the thread. In this way any number of files can be dropped in the container and each of them will be indexed, linked and shared with the thread and its participants.

At 150, a participant selects a thread and initiates a multi-user chat (MUC) session on a temporary or persistent chat room, utilizing the thread UI 16/18 and a communication tool 12 of the client device 4-N. At 154, the communication tool 12 communicates with the appropriate communication tool server 20-M to establish or load the MUC with other participants, whether or not they are present at the moment, and a URI associated with the MUC extracted at 151. At 152, the participant, via thread UI 16/18, meta-data for the URI is linked to the thread ID with the collaboration thread service 44. Optionally, at 156, the collaboration ETL service 50 extracts or subscribes to activity in the MUC from the communication tool server, the previously stored thread ID can be fetched at 157 from the context service 47 in the collaboration thread service 44 so that it can be ingested, analyzed, indexed, linked and stored in the collaboration thread service 44, and the MUC can be linked to the thread by obtaining the URI from the thread context service 47. At 158, the file sharing service is linked to the thread. Participants in the thread are notified of the update.

If the MUC associated with the thread is persistent and linked to a thread in this manner, the thread will always have a live chat available. Notice that the same conditions apply in the case of the linked MUC regarding access control as they did to the shared file or file service. Just because the external chat room is linked to the thread does not ensure that the thread participant will be authorized to join the chat room. However, if the thread ETL service 50 is authorized to subscribe to MUC activity, that content from the room can be indexed, searched, and viewed by participants in the thread even if they don't have access to the room itself.

A participant, utilizing a collaboration thread UI, can name the collaboration thread with a suitable description (e.g., "Meeting for Project X") so that the collaboration session including content for all communications linked to the session can easily be found by any participant in the collaboration group.

After communications have terminated between invited participants using their client devices 4-N and utilizing a host communication tool server 20-M (e.g., one or more TP servers with supporting infrastructure to facilitate hosting of the TP meeting), the communication tool server 20-M provides the content (including optional recorded audio and video content of the meeting, transcribed text content of the meeting as processed by the TP server(s), and associated metadata in relation to such content) to the thread server 40 via the back end interface for indexing and storage by the thread media storage service 45 and search service 48.

The scenario described in relation to FIGS. 9A and 9B links communications and related content from multiple communication tools (email tools including calendar features from mobile devices and laptop or desktop devices, IM and IM chat sessions, video conference TP meetings) to a single collaboration thread that is accessible by all collaboration group participants. Each group participant can access content associated with any communication of the collaboration thread by simply accessing the collaboration thread within a collaboration thread UI of a communication tool for the client device 4-N of the participant. No shared Dropbox service or other file content sharing service need be set up by any of the participants, since the content associated with the communications linked to the collaboration thread is already stored by the collaboration thread management server 40 for access by the participants.

An example embodiment of a stand-alone collaboration thread UI 18 in a client device 4-N that facilitates operation within a collaboration platform is depicted in FIG. 7. The UI 58 can be associated with a communication tool for the client device 4-N that facilitates operation with, e.g., an email communication client tool 13, collaborative thread server 40 and communication servers 20-M that facilitate different types of communications (e.g., email, IM, VoIP, etc.) for the participant at the device 4-N within a collaborative platform (e.g., Cisco Jabber collaborative service). The UI 58 includes a window displaying a listing of communications 61 for a selected collaboration thread, such as thread 60. Panel 64 within the UI 58 provides a link to content associated with the collaboration thread 60, where the participant can select content to retrieve from the thread server 40 for review within the UI 58 or utilizing any other suitable software applications located on the client device 4-N (e.g., word processing applications, spreadsheet applications, slide presentation applications, etc.). Panel 62 provides a listing of collaboration group participants for the thread 60, where each participant can be contacted utilizing controls on panel 66 (e.g., to initiate a VoIP phone call, an IM, etc.) by the participant operating the UI 58 simply selecting the appropriate contact control associated with each group participant. Panel 68 within the UI 58 provides a time-ordered or relevance-ranked or search-filtered listing 69 of other collaboration threads, where the participant can select another thread which would result in associated content and group participants being populated within panel 61.

Figure 10:
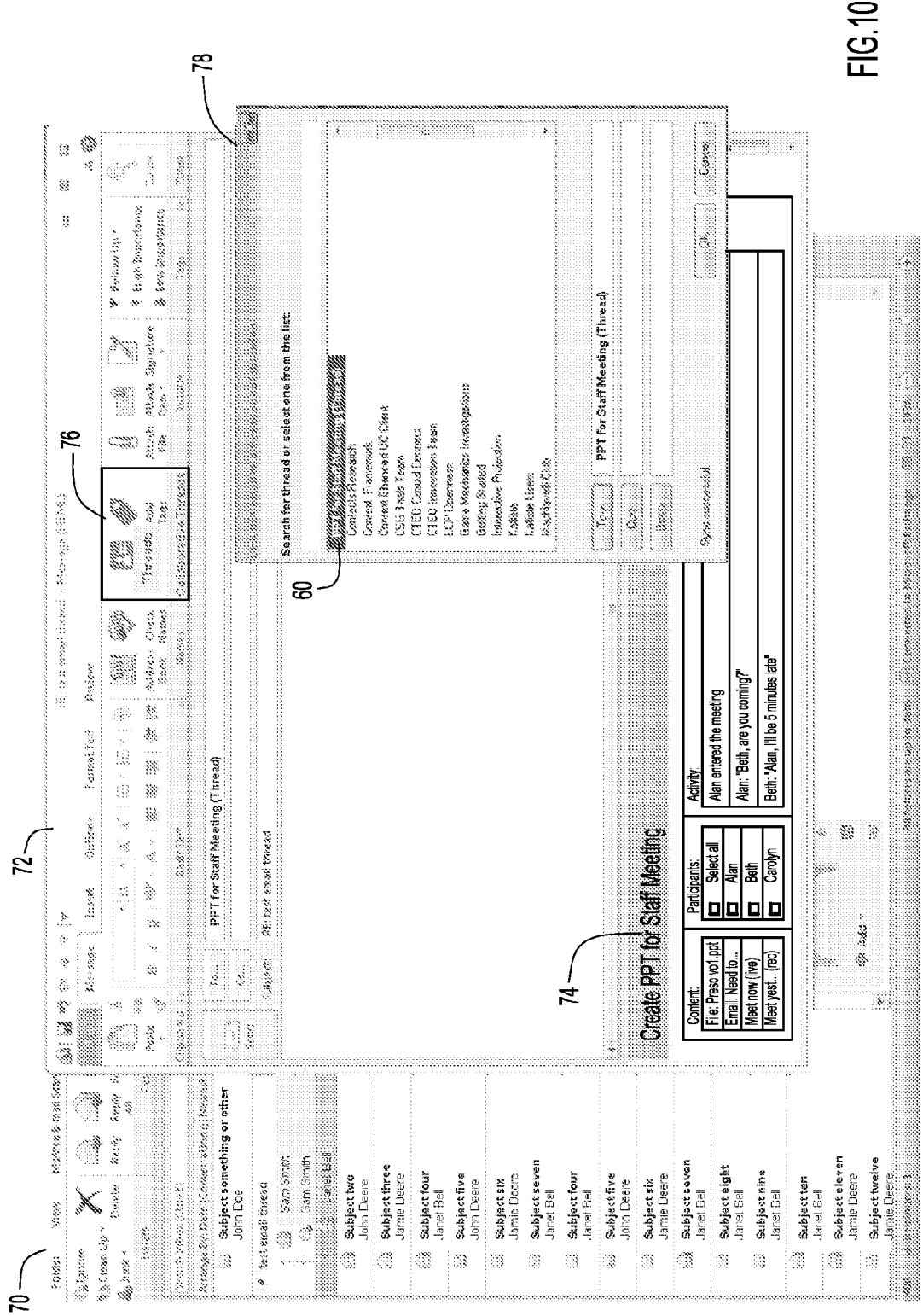
FIG. 10 depicts an example embodiment of a collaboration thread user interface as a plug-in within a user interface for an email communication tool of a participant utilizing the systems and techniques described herein.

An example embodiment of a plug-in collaboration thread UI 16 in a client device 4-N that facilitates operation within a communication tool such as Outlook on a collaboration platform is depicted in FIG. 10. The UI 70 in this case can be, e.g., Microsoft Outlook associated with a communication tool for the client device 4-N that facilitates operation with an email server such as Microsoft Exchange. The collaboration thread UI in this case is an Outlook plug-in 16, associated with a collaborative thread management server 40. The collaboration threads UI is divided into three elements in this embodiment, illustrated within the email reply window 72. First there is a thread control 76 to bring up a window 78 to select a current thread from a relevance ranked list of collaboration threads from a thread server 40. Thread 60 is shown in the selected state. By selecting the thread, the email is shown as being addressed to the thread itself. Panel 74 within the Outlook reply window 72 provides links to content linked to the thread as well as a listing of collaboration group participants for the thread 60, where each participant can be contacted individually in addition to being included in the message extracted, indexed, stored and linked to the thread. Window 78 within the Outlook plugin provides a time-ordered, relevance-ranked, or search-filtered listing of other collaboration threads, where the participant can select another thread which would result in associated content and group participants being populated within panel 74. When the email is sent, all of the selected participants will be addressed. In addition, the email will be associated with the thread by addressing the thread itself or by tagging the email content or meta-data with an identifier so that it can be extracted, indexed, stored and linked to the thread in the thread server 40.

Thus, the systems and techniques described herein facilitate establishing collaboration threads for different types of communications which utilize different communication tools so as to provide an easy reference mechanism for a collaboration group participant to access communications and related content for a collaboration utilizing a single reference tool. A participant, referencing a recent communication within the collaboration thread that was generated from one communication tool (e.g., an email message) can utilize this communication utilizing the collaboration thread to initiate another communication with another communication tool (e.g., an IM, a phone call, an online video meeting, etc.). The linking of different types of communications that are relevant to each other in a collaboration is rendered easily by participants defining such links to communications within a collaboration thread. This eliminates the need for administrative overhead to attempt to link communications with other communications or utilizing automated software with complex semantic analysis to attempt to make such connections, since the participants themselves are linking the communications to a single collaboration thread. Further, the search engine features within the collaboration thread service layer render easy identification, searching and discovery of collaboration threads by participants, particularly in situations in which a collaboration thread needs to be found and accessed after a period of time has elapsed in which the collaboration thread is no longer considered a recent thread.

The above description is intended by way of example only.

What is claimed is:

1. A method comprising:
capturing, via a server, a communication between a plurality of participants via computing devices of the participants and utilizing a communication tool associated with the computing devices;
linking, via the server, the communication to a collaboration thread that is accessible by each participant via a computing device of each participant, wherein the collaboration thread comprises a container object that provides access to stored content associated with each communication linked to the collaboration thread; and
notifying, via the server, each participant of the collaboration thread including an indication that the collaboration thread has been revised based upon the linking of the communication to the collaboration thread;
wherein:
the server facilitates linking of the communication to an existing collaboration thread in response to a participant of the communication providing to the server, during initiation of the communication, an association of the communication with the existing collaboration thread by participant selection of the existing collaboration thread from a list of collaboration threads; and
the collaboration thread is accessible via a plug-in module for a user interface of an email communication tool at a computing device of a participant, the user interface including access to different types of communications via different communication tools, and the stored content associated with each type of communication is accessible via the collaboration thread, the user interface including a displayed first list of a plurality of participants associated with the collaboration thread and a displayed second list of different types of communications, wherein the different types of communications of the second list include an email, an instant message, and a phone call that is interactive between at least two participants, and the user interface enables a participant associated with the collaboration thread to select, via the user interface, any combination of one or more participants from the first list together with any type of communication from the second list, that results in automatic initiation of the selected type of communication with the selected one or more participants.

2. The method of claim 1, wherein the communication is automatically linked by the server to a new collaboration thread when no participant of the communication provides any association to the server of the communication with any other existing collaboration thread.

3. The method of claim 2, wherein the communication is linked to an existing collaboration thread or a new collaboration thread by at least one of: utilizing meta-data of the communication that references the collaboration thread, utilizing other data provided within content of the communication that references the collaboration thread, and utilizing an independent context that is distinct from the communication and that links an identity of the communication with an identity of the collaborative thread.

4. The method of claim 2, wherein the participants of each communication linked with the existing collaboration thread have access to content associated with links to all communications within the existing collaboration thread.

5. The method of claim 1, wherein the different communication tools facilitate different communications comprising at least one of email, file sharing, peer-to-peer instant messaging, multi-user chat messaging, voice over IP communications, and online video conferencing sessions.

6. The method of claim 1, wherein the stored content comprises at least one of participant contact information, content exchanged by participants within each communication, meta-data from a plurality of communications of different types from a plurality of participants and from a plurality of devices of different types, and links to synchronous media resources comprising at least one of audio resources and video resources.

7. The method of claim 1, wherein the user interface facilitates access to and selection from a plurality of different, existing collaboration threads associated with the participant accessing the user interface.

8. The method of claim 7, wherein the notifying each participant of the collaboration thread including an indication that the collaboration thread has been revised comprises:
  including the collaboration thread in a list of a plurality of collaboration threads within the user interface that ranks the collaboration threads by at least one criteria selected from the group consisting of time at which a collaboration thread has been revised, number of participants associated with a thread, and number of communications associated with a collaboration thread.

9. The method of claim 7, further comprising:
  facilitating searching for collaboration threads associated with the participant within the user interface utilizing search criteria input by the participant within the user interface.

10. The method of claim 1, further comprising:
  in response to a participant of the collaboration thread defining an association of the collaboration thread with a second collaboration thread, merging the collaboration thread with the second collaboration thread to define a single collaboration thread including links to all communications and participants from the collaboration thread and the second collaboration thread within the single collaboration thread.

11. The method of claim 1, further comprising:
  extracting and indexing content, via the server, from the communication to facilitate searching and retrieving of the content, wherein the extracted and indexed content comprises at least one of contact information for participants associated with the communication and other content associated with the communication.

12. The method of claim 1, wherein the server directly communicates with the computing devices of the participants to facilitate notifying participants of revisions to collaboration threads and providing access to content of collaboration threads stored within the container object, and the server also directly communicates with a plurality of communication tool servers to facilitate capturing and linking of communications with collaboration threads.

13. An apparatus comprising:
  a memory configured to store instructions including one or more applications that support communications between the apparatus and other computing devices over a network;
  a network interface device configured to enable communications over the network; and
  a processor coupled to the network interface device and the memory, and configured to execute and control operations of the one or more applications so as to:
  capture a communication between a plurality of participants via computing devices of the participants and utilizing a communication tool associated with the computing devices;
  link the communication to a collaboration thread that is accessible by each participant via a computing device of each participant, wherein the collaboration thread comprises a container object that provides access to stored content associated with each communication linked to the collaboration thread; and
  notify each participant of the collaboration thread including an indication that the collaboration thread has been revised based upon the linking of the communication to the collaboration thread;
  wherein:
    the processor facilitates linking of the communication to an existing collaboration thread in response to a participant of the communication providing to the apparatus, during initiation of the communication, an association of the communication with the existing collaboration thread by participant selection of the existing collaboration thread from a list of collaboration threads; and
    the processor facilitates access to the collaboration thread via a plug-in module for a user interface of an email communication tool at a computing device of a participant, the user interface including access to different types of communications via different communication tools, and the stored content associated with each type of communication is accessible via the collaboration thread, the user interface including a displayed first list of a plurality of participants associated with the collaboration thread and a displayed second list of different types of communications, wherein the different types of communications of the second list include an email, an instant message, and a phone call that is interactive between at least two participants, and the user interface enables a participant associated with the collaboration thread to select, via the user interface, any combination of one or more participants from the first list together with any type of communication from the second list, that results in automatic initiation of the selected type of communication with the selected one or more participants.

14. The apparatus of claim 13, wherein the processor is further configured to link the communication to a new collaboration thread when no participant of the communication provides any association of the communication with any other existing collaboration thread.

15. The apparatus of claim 14, wherein the processor is further configured to link the communication to an existing collaboration thread or a new collaboration thread by at least one of: utilizing meta-data of the communication that references the collaboration thread, utilizing other data provided within content of the communication that references the collaboration thread, and utilizing an independent context that is distinct from the communication and that links an identity of the communication with an identity of the collaborative thread.

16. The apparatus of claim 13, wherein the different communication tools facilitate different communications comprising at least one of email, file sharing, peer-to-peer instant messaging, multi-user chat messaging, voice over IP communications, and online video conferencing sessions.

17. One or more tangible computer readable storage devices encoded with software comprising computer executable instructions and when the software is executed operable to:
  capture a communication between a plurality of participants via computing devices of the participants and utilizing a communication tool associated with the computing devices;
  link the communication to a collaboration thread that is accessible by each participant via a computing device of each participant, wherein the collaboration thread comprises a container object that provides access to stored content associated with each communication linked to the collaboration thread; and notify each participant of the collaboration thread including an indication that the collaboration thread has been revised based upon the linking of the communication to the collaboration thread;

wherein:
the computer executable instructions facilitate linking of the communication to an existing collaboration thread in response to a participant of the communication providing, during initiation of the communication, an association of the communication with the existing collaboration thread by participant selection of the existing collaboration thread from a list of collaboration threads; and the computer executable instructions facilitate access to the collaboration thread via a plug-in module for a user interface of an email communication tool at a computing device of a participant, the user interface including access to different types of communications via different communication tools, and the stored content associated with each type of communication is accessible via the collaboration thread, the user interface including a displayed first list of a plurality of participants associated with the collaboration thread and a displayed second list of different types of communications, wherein the different types of communications of the second list include an email, an instant message, and a phone call that is interactive between at least two participants, and the user interface enables a participant associated with the collaboration thread to select, via the user interface, any combination of one or more participants from the first list together with any type of communication from the second list, that results in automatic initiation of the selected type of communication with the selected one or more participants.

18. The one or more tangible computer readable storage devices of claim 17, wherein the instructions are operable to link the communication to a new collaboration thread when no participant of the communication provides any association to the server of the communication with any other existing collaboration thread.

19. The one or more tangible computer readable storage devices of claim 18, wherein the instructions are operable to link the communication to an existing collaboration thread or a new collaboration thread by at least one of: utilizing meta-data of the communication that references the collaboration thread, utilizing other data provided within content of the communication that references the collaboration thread, and utilizing an independent context that is distinct from the communication and that links an identity of the communication with an identity of the collaborative thread.

20. The one or more tangible computer readable storage devices of claim 18, wherein the instructions are operable to provide access to participants of each communication linked with the existing collaboration thread to content associated with links to all communications within the existing collaboration thread.

21. The one or more tangible computer readable storage devices of claim 17, wherein the instructions are operable to facilitate access to different types of communications comprising at least one of email, file sharing, peer-to-peer instant messaging, multi-user chat messaging, voice over IP communications, and online video conferencing sessions.

22. The one or more tangible computer readable storage devices of claim 17, wherein the instructions are operable to facilitate access to stored content via the collaboration thread that comprises at least one of participant contact information, content exchanged by participants within each communication, meta-data from a plurality of communications of different types from a plurality of participants and from a plurality of devices of different types, and links to synchronous media resources comprising at least one of audio resources and video resources.

23. The one or more tangible computer readable storage devices of claim 17, wherein the instructions are further operable to:
facilitate access, via the user interface, to and selection from a plurality of different, existing collaboration threads associated with the participant accessing the user interface.

24. The one or more tangible computer readable storage devices of claim 23, wherein the instructions are operable to notify each participant of the collaboration thread including an indication that the collaboration thread has been revised by:
including the collaboration thread in a list of a plurality of collaboration threads within the user interface that ranks the collaboration threads by at least one criteria selected from the group consisting of time at which a collaboration thread has been revised, number of participants associated with a thread, and number of communications associated with a collaboration thread.

25. The one or more tangible computer readable storage devices of claim 23, wherein the instructions are further operable to:
facilitate searching for collaboration threads associated with the participant within the user interface utilizing search criteria input by the participant within the user interface.

26. The one or more tangible computer readable storage devices of claim 17, wherein the instructions are further operable to:
in response to a participant of the collaboration thread defining an association of the collaboration thread with a second collaboration thread, merge the collaboration thread with the second collaboration thread to define a single collaboration thread including links to all communications and participants from the collaboration thread and the second collaboration thread within the single collaboration thread.

27. The one or more tangible computer readable storage devices of claim 17, wherein the instructions are further operable to:
extract and index content from the communication to facilitate searching and retrieving of the content, wherein the extracted and indexed content comprises at least one of contact information for participants associated with the communication and other content associated with the communication.

* * * * *